US008144762B2

(12) United States Patent
Komamura

(10) Patent No.: US 8,144,762 B2
(45) Date of Patent: Mar. 27, 2012

(54) BAND EXTENDING APPARATUS AND METHOD

(75) Inventor: Mitsuya Komamura, Tsurugashima (JP)

(73) Assignees: Pioneer Corporation, Tokyo (JP); Techexperts Incorporation, Tokyo (JP)

( * ) Notice: Subject to any disclaimer, the term of this patent is extended or adjusted under 35 U.S.C. 154(b) by 678 days.

(21) Appl. No.: 12/373,898

(22) PCT Filed: Jul. 31, 2006

(86) PCT No.: PCT/JP2006/315165

§ 371 (c)(1), (2), (4) Date: Jan. 15, 2009

(87) PCT Pub. No.: WO2008/015732

PCT Pub. Date: Feb. 7, 2008

(65) Prior Publication Data

US 2010/0014576 A1 Jan. 21, 2010

(51) Int. Cl.
*H04B 1/66* (2006.01)

(52) U.S. Cl. ........................................ 375/240

(58) Field of Classification Search .................. 375/240
See application file for complete search history.

(56) References Cited

U.S. PATENT DOCUMENTS 5,267,095 A 11/1993 Hasegawa et al.
2003/0118176 A1* 6/2003 Tokuda et al. ........... 379/390.01
2006/0227018 A1* 10/2006 Ejima et al. ..................... 341/50
2008/0129350 A1* 6/2008 Mitsufuji et al. ............. 327/113

FOREIGN PATENT DOCUMENTS

JP 4-245062 9/1992
JP 6-85607 3/1994
JP 7-93900 4/1995
JP 7-236193 9/1995
JP 2003-256000 9/2003
JP 2003-317395 11/2003
JP 2005-128387 5/2005

OTHER PUBLICATIONS

R. Aarts et al., "Improving Perceived Bass and Reconstruction of High Frequencies for Band Limited Signals", Proc. 1st IEEE Benelux Workshop on Model Processing and Coding of Audio (MPCA-2002), Leuven, Belgium, Nov. 12, 2002.

* cited by examiner

*Primary Examiner* — Jaison Joseph
(74) *Attorney, Agent, or Firm* — Young & Thompson

(57) ABSTRACT

A band extending apparatus (1) is provided with: first generating device (111, 112) for generating a baseband signal (XB(n)) by up-sampling an input signal (X(n)) and then transmitting it through a low-pass filter; a second generating device (21) for generating a high-frequency signal ($X_H$(n)), by extracting a signal component on a higher-frequency side of a signal which is obtained by squaring a band limited signal ($X_b$(n)) which is a signal component with a predetermined band of the baseband signal; and a third generating device (141) for generating an output signal ($X_E$(n)) by adding the high-frequency signal to the baseband signal.

11 Claims, 19 Drawing Sheets

3

[FIG. 1]
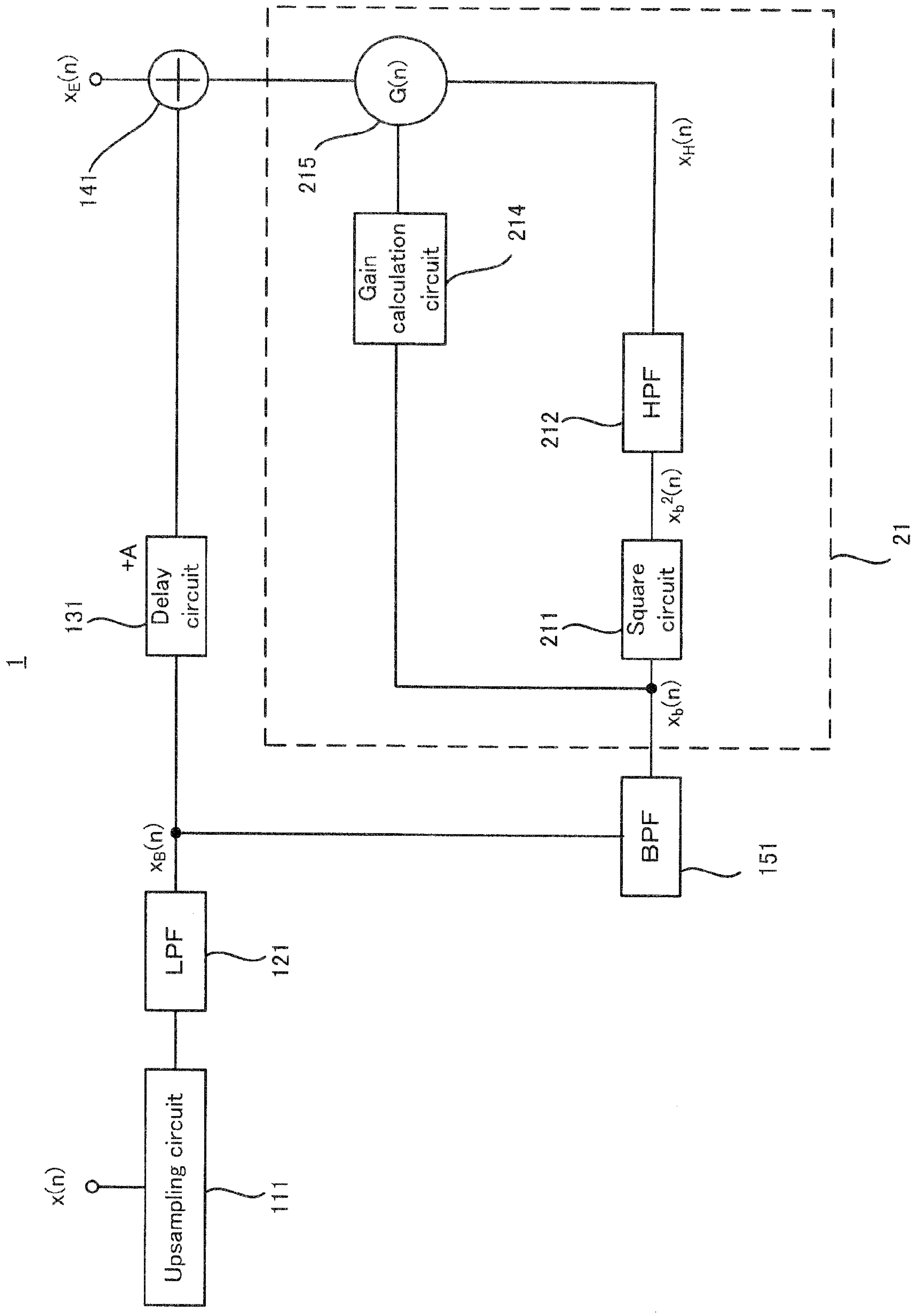

[FIG. 2]
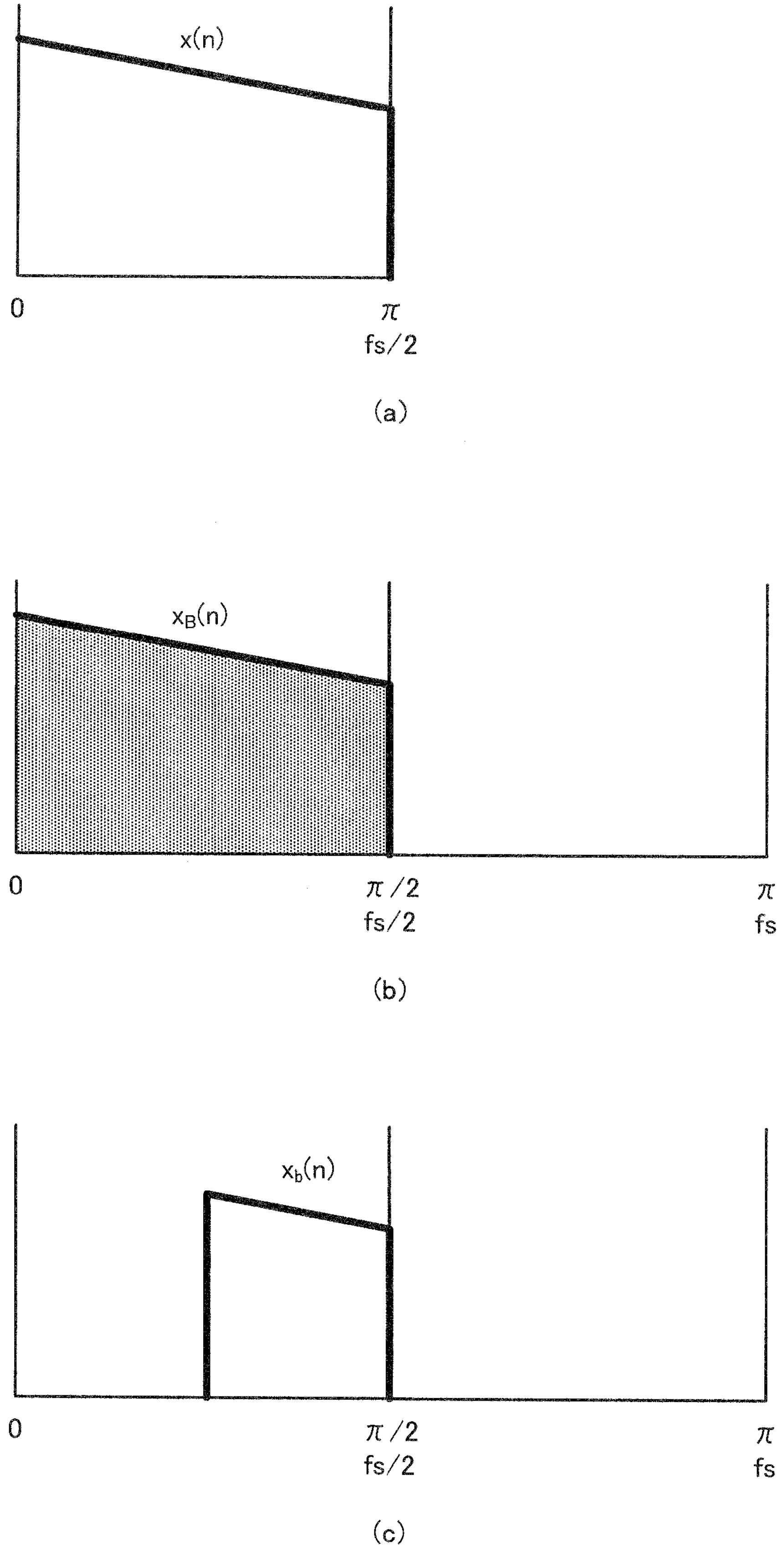

[FIG. 3]
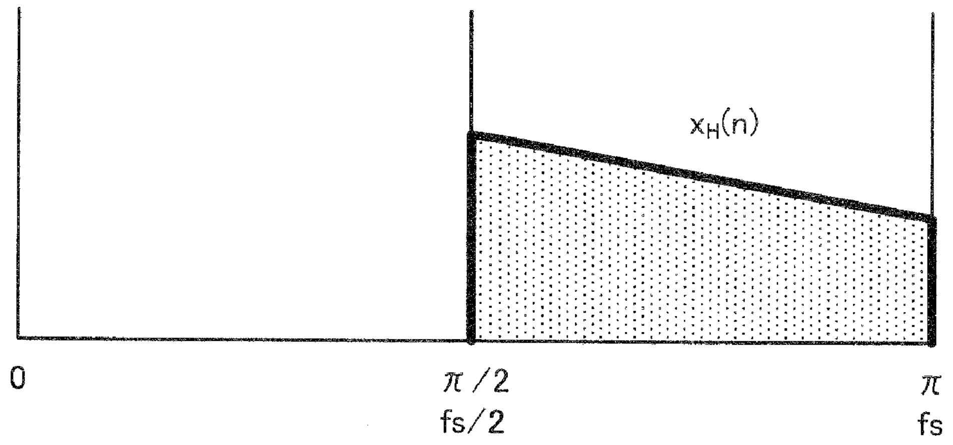
(a)
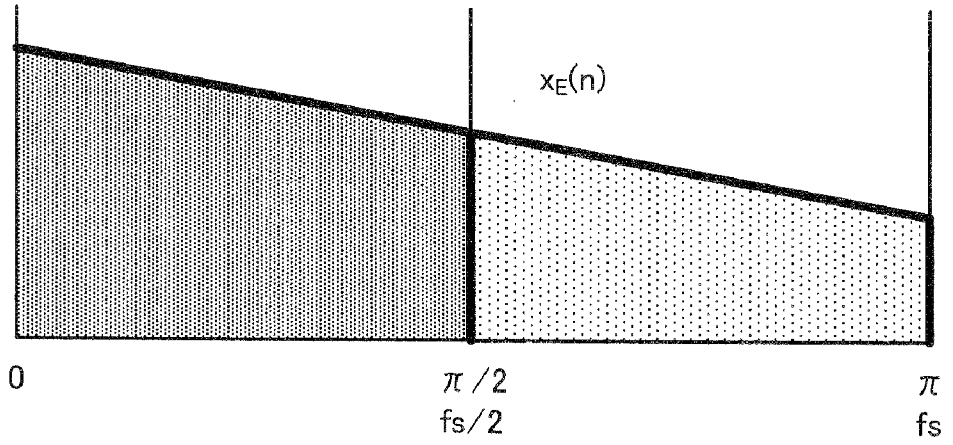
(b)

[FIG. 4]
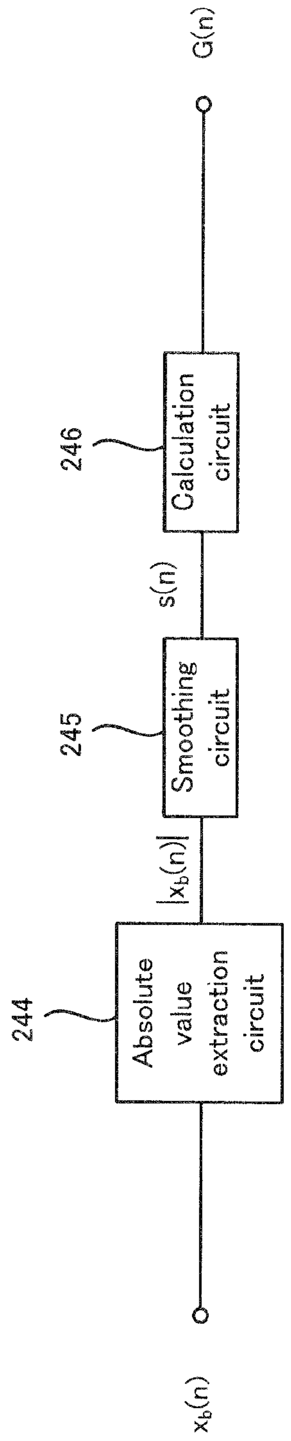

[FIG. 5]
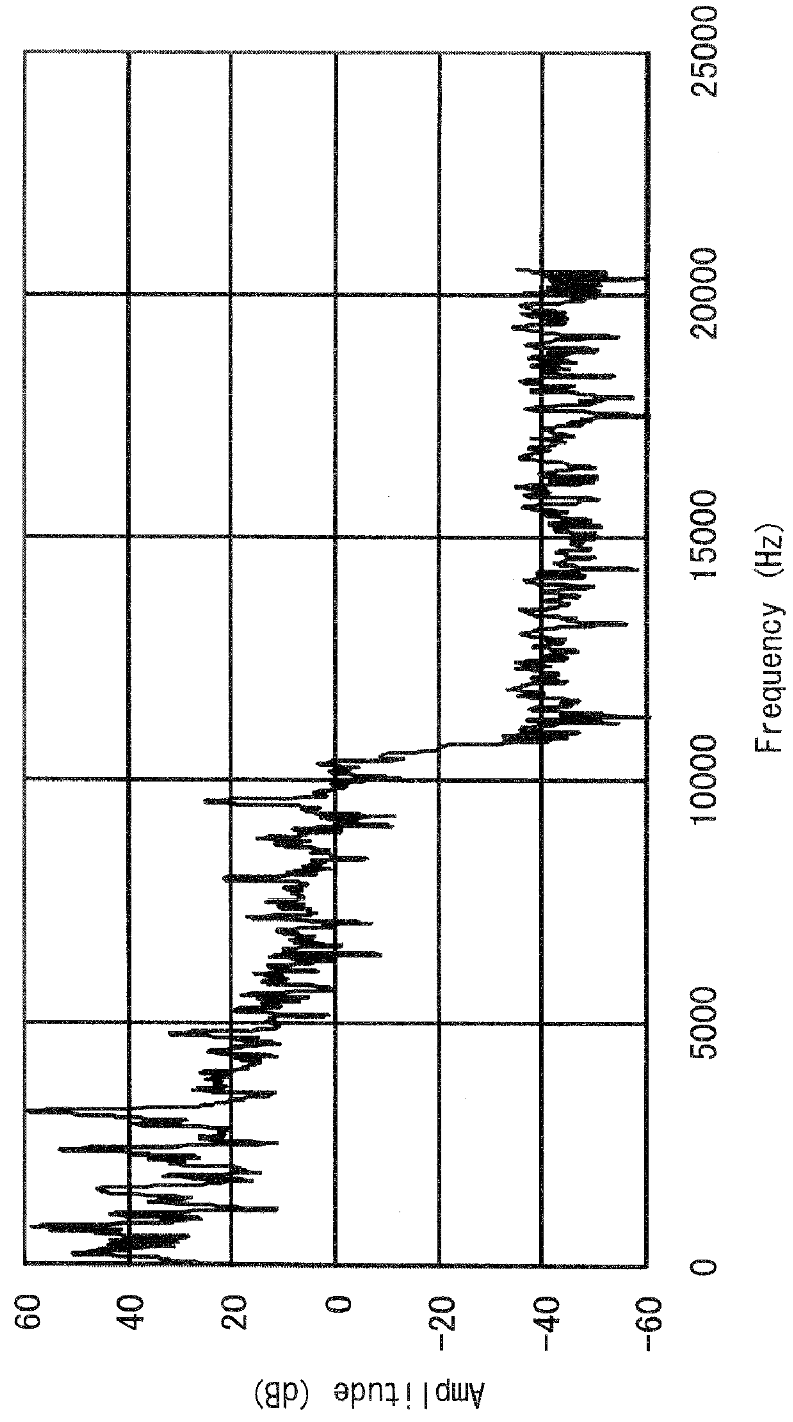

[FIG. 6]
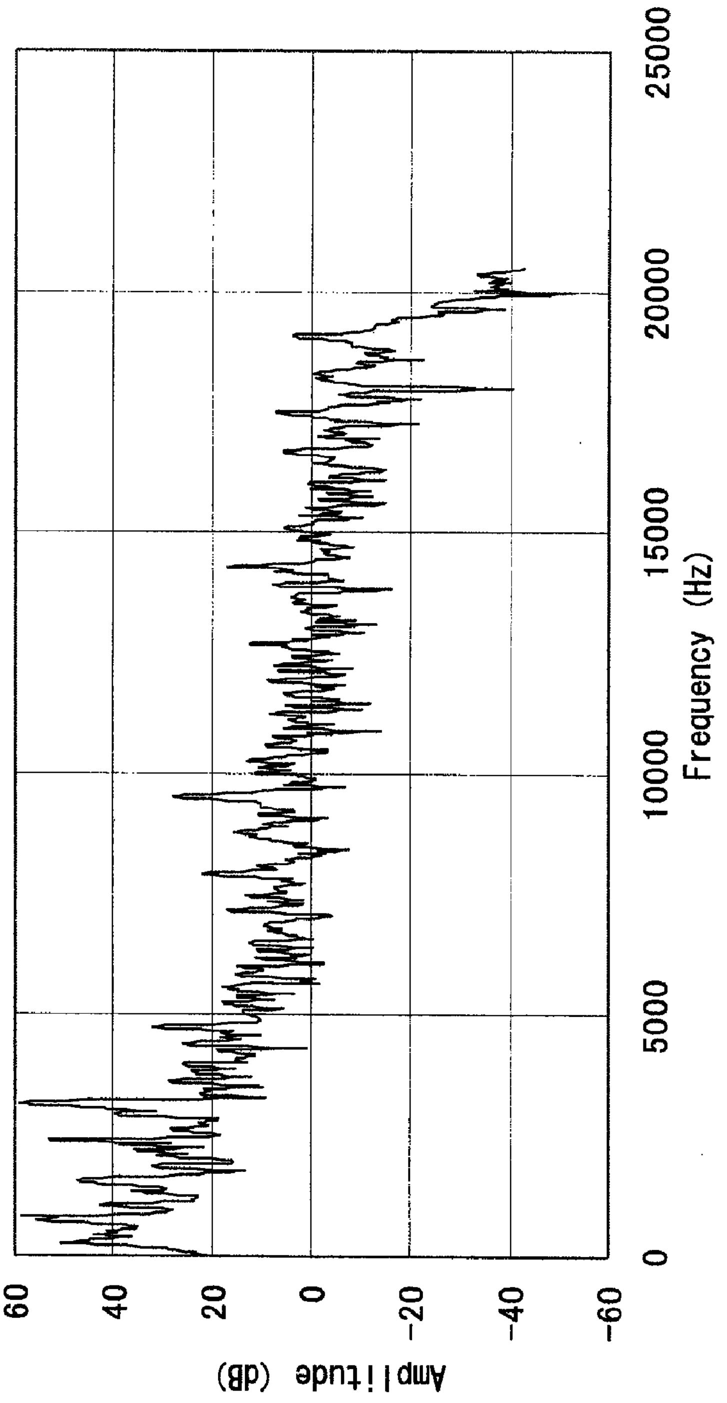

[FIG. 7]
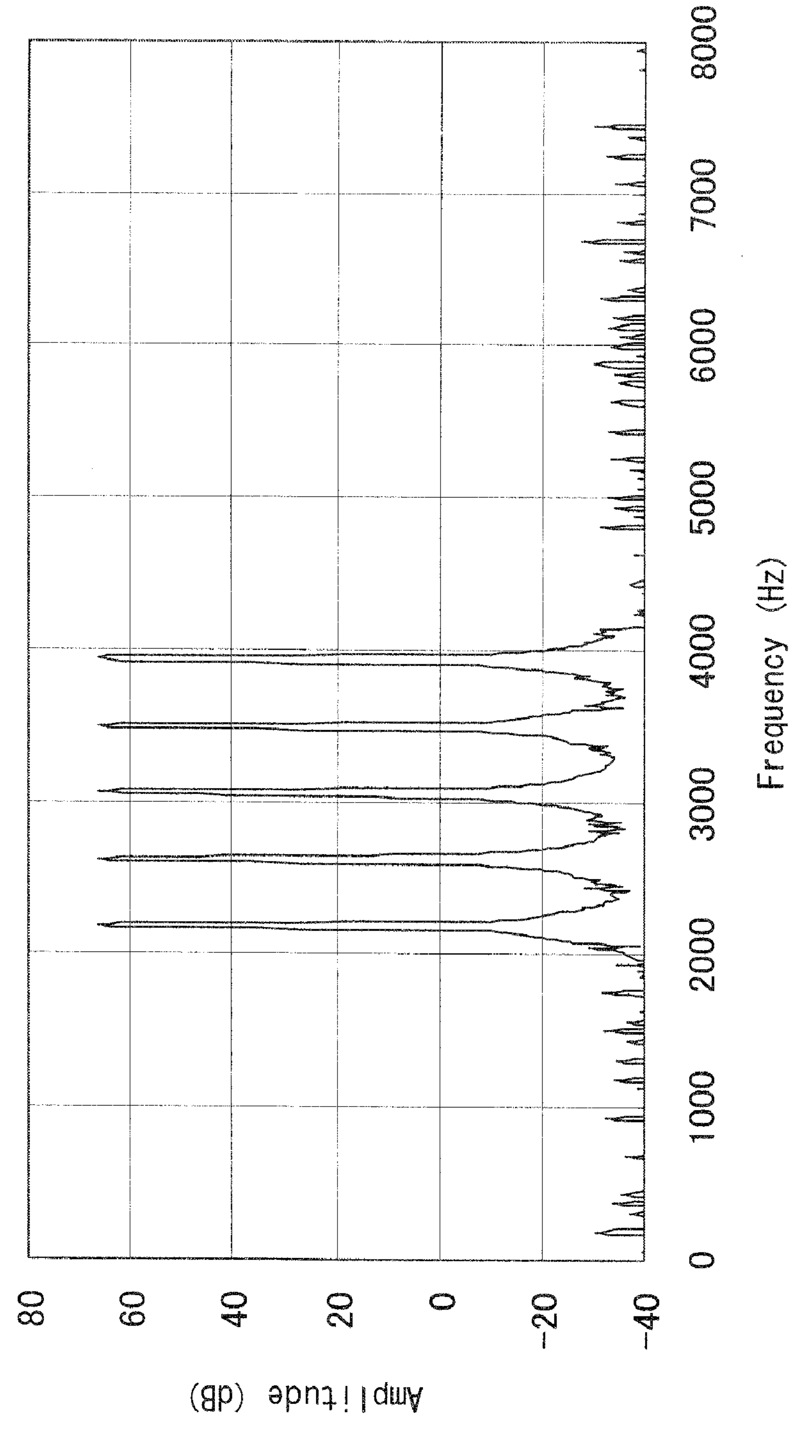

[FIG. 8]
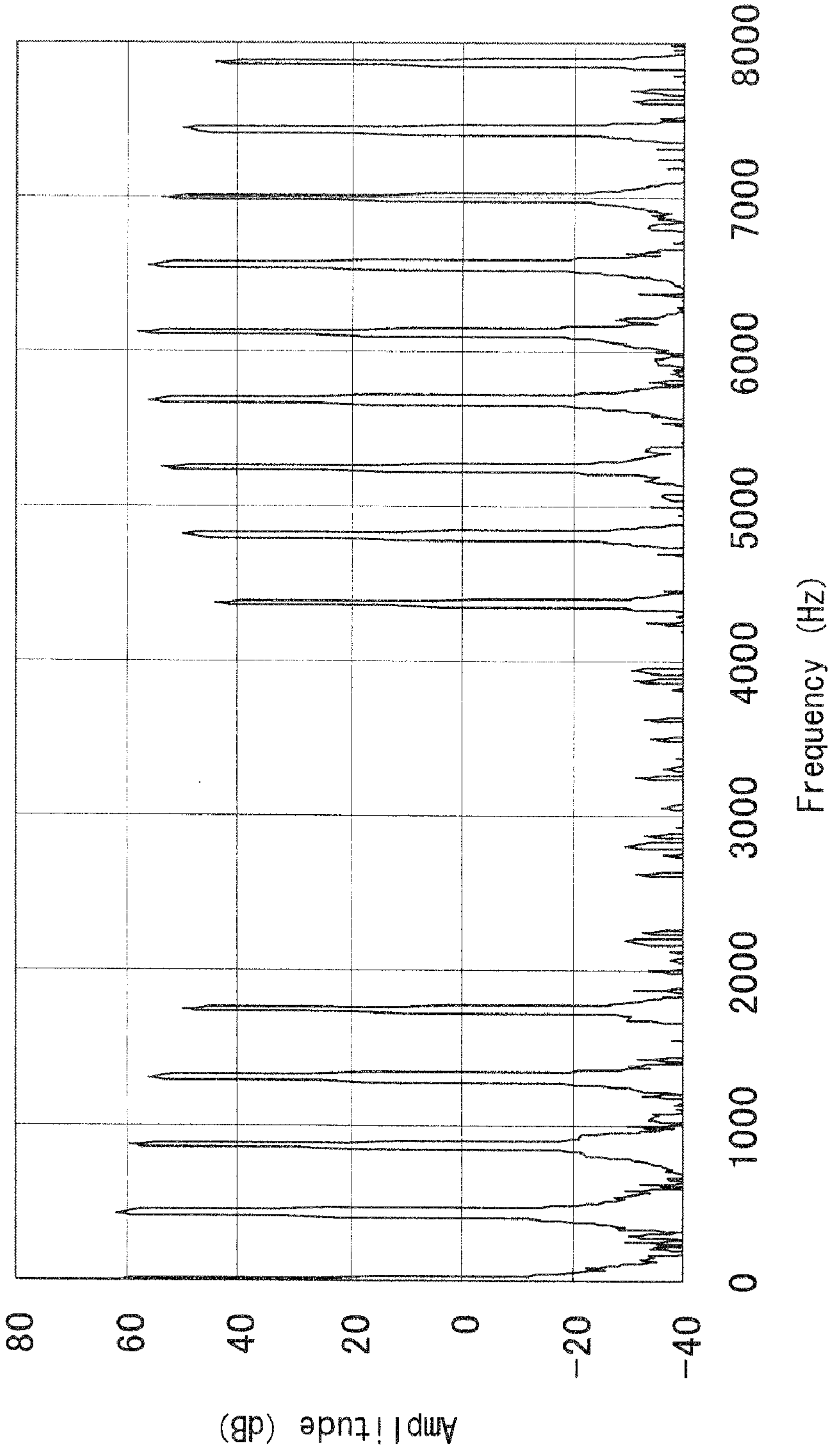

[FIG. 9]
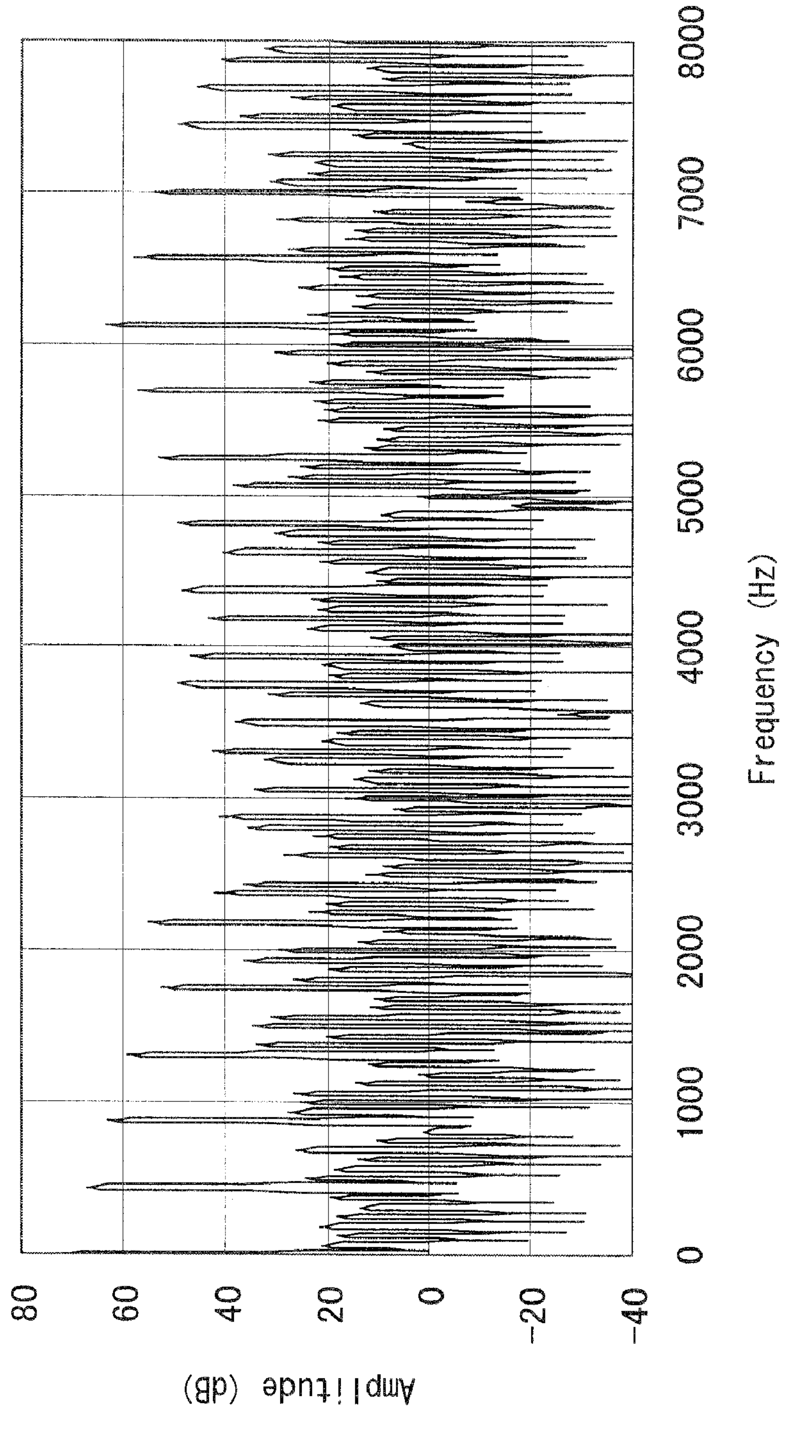

[FIG. 10]
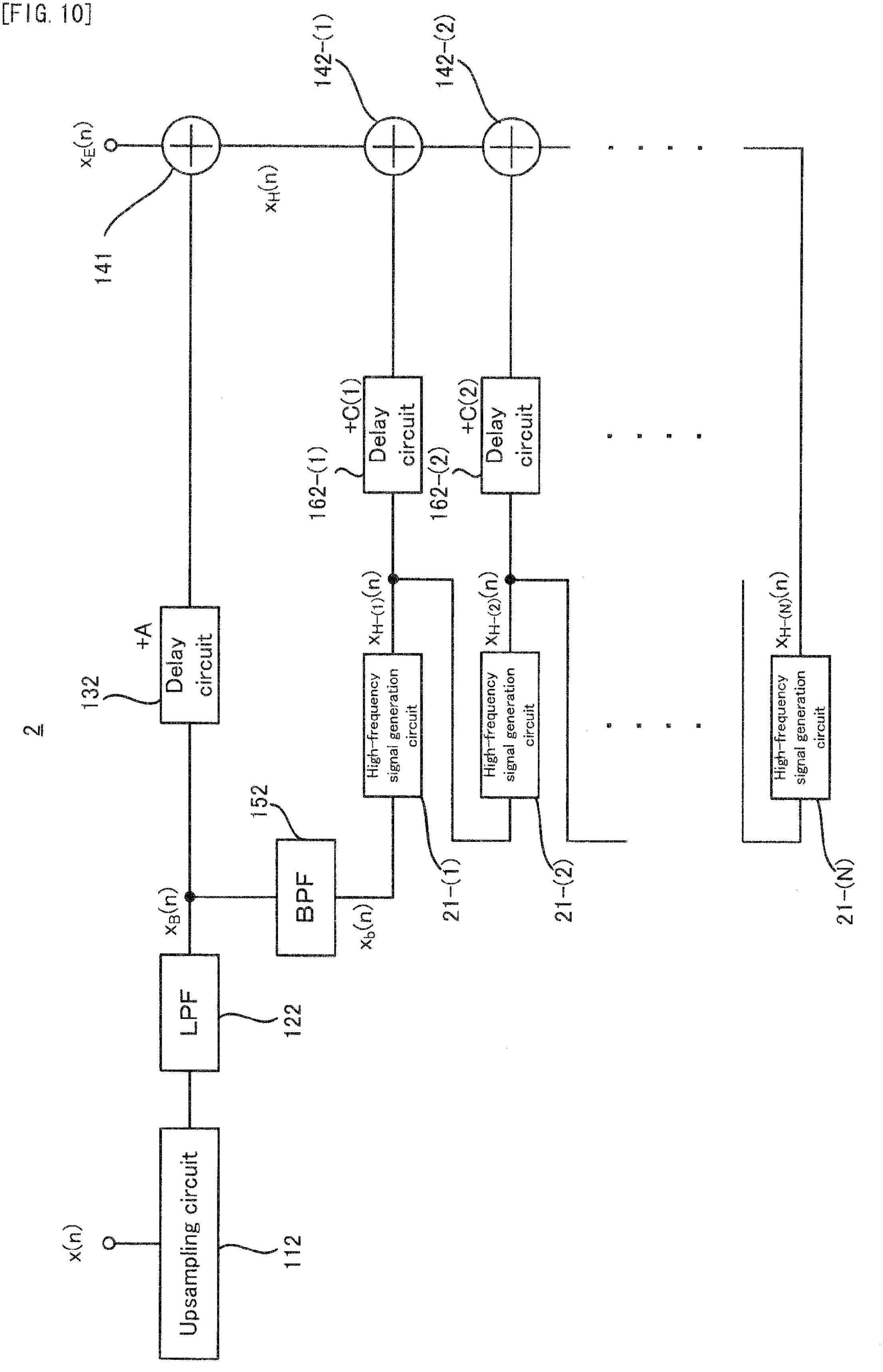

[FIG. 11]
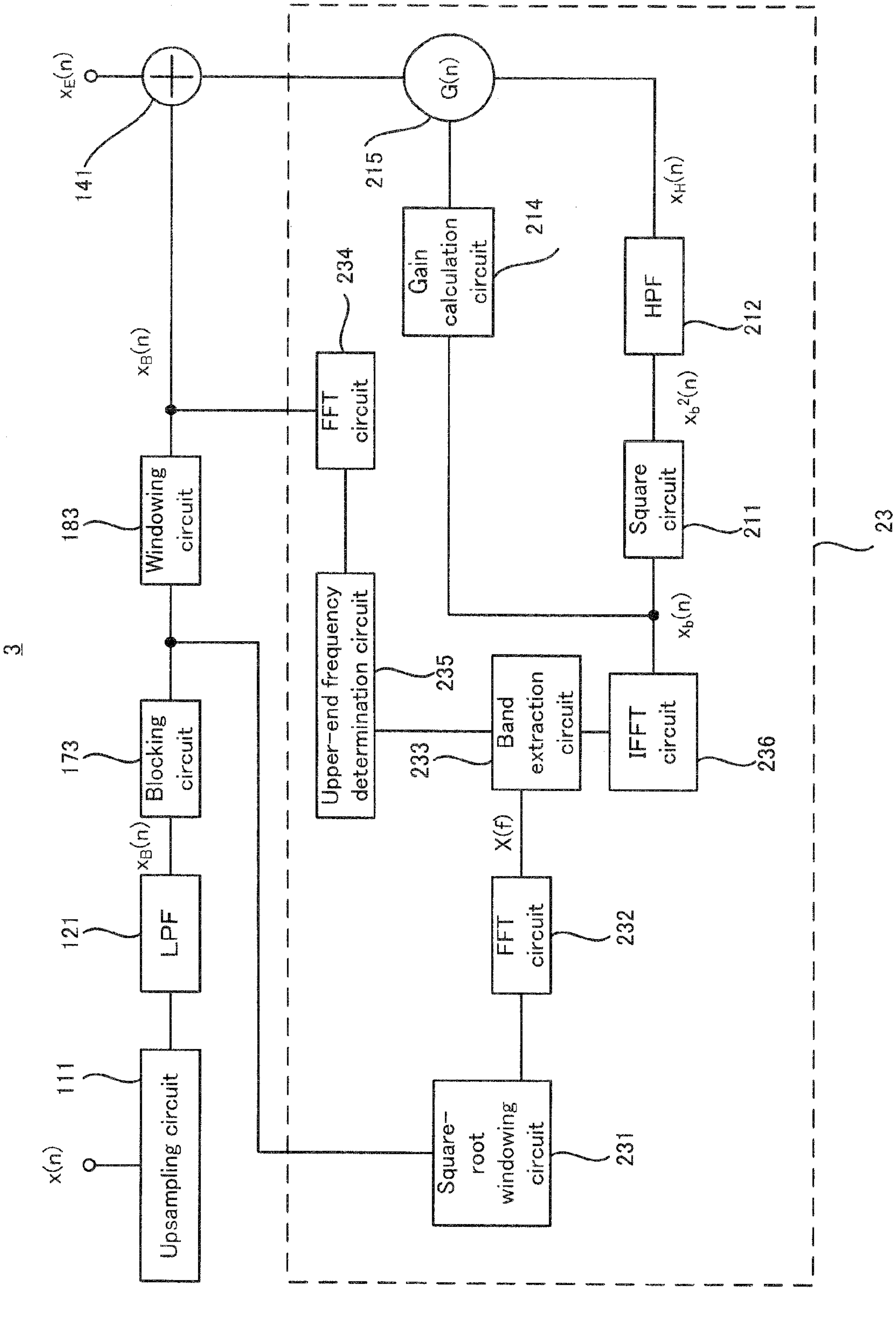

[FIG. 12]
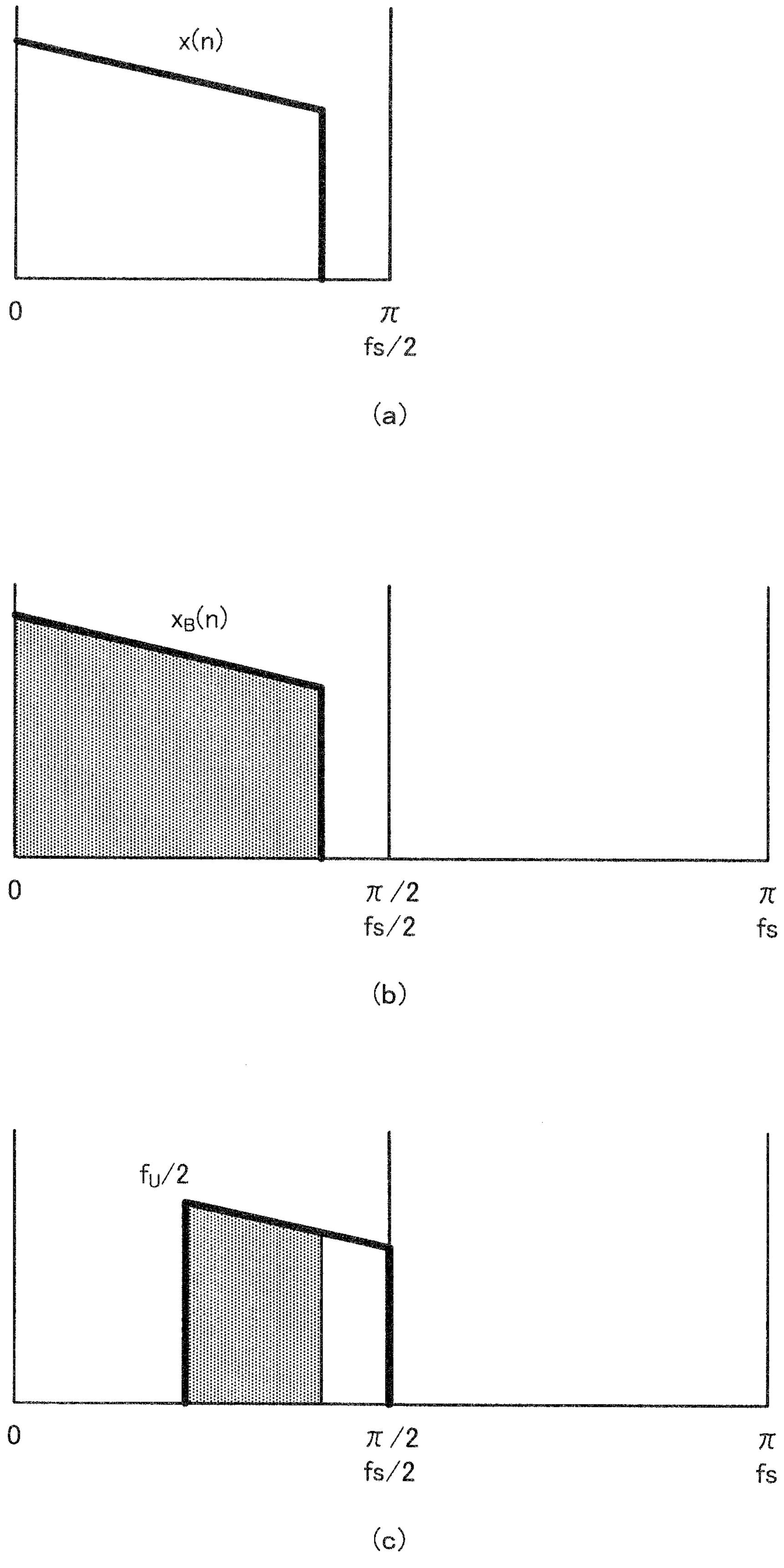

[FIG. 13]
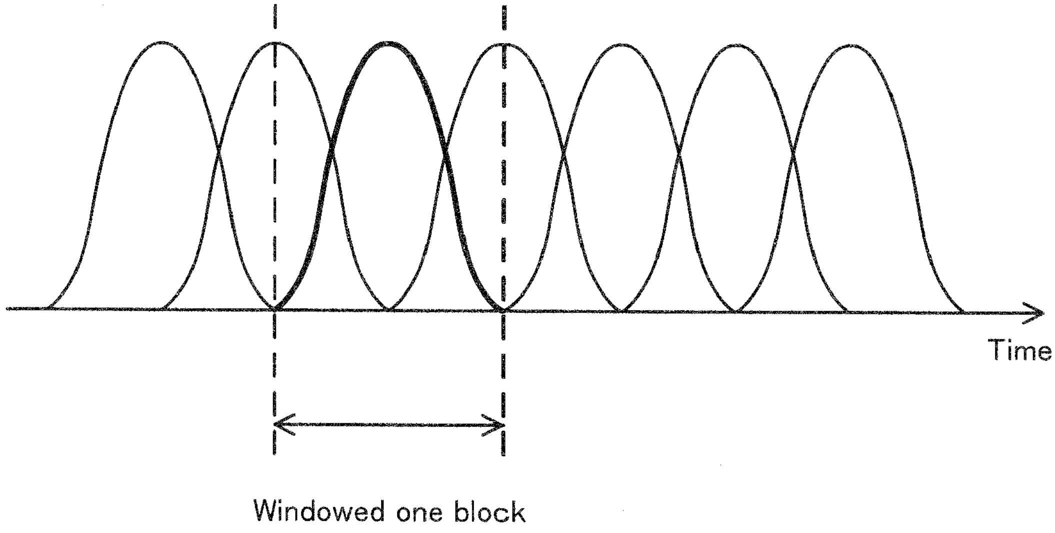

[FIG. 14]
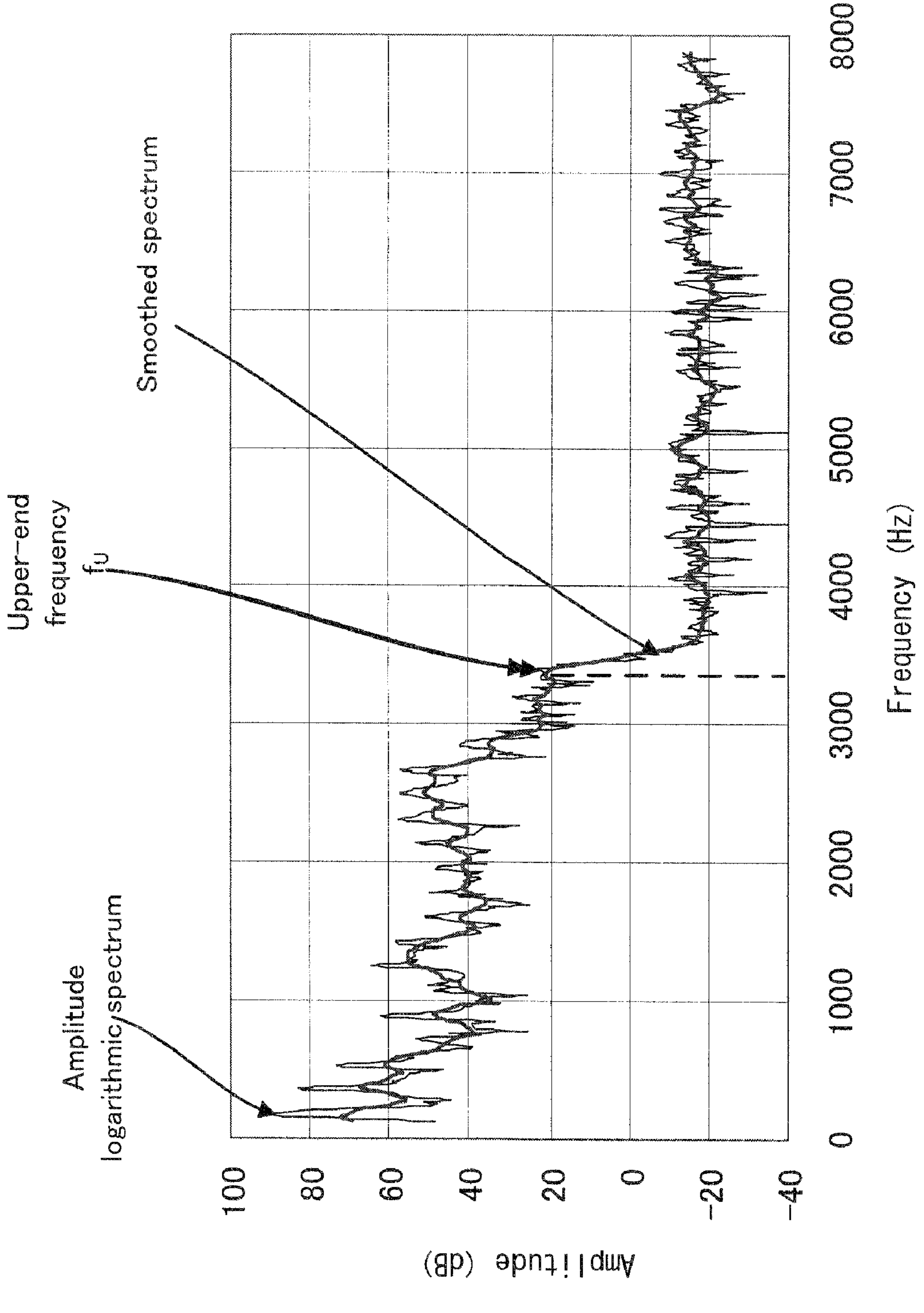

[FIG. 15]
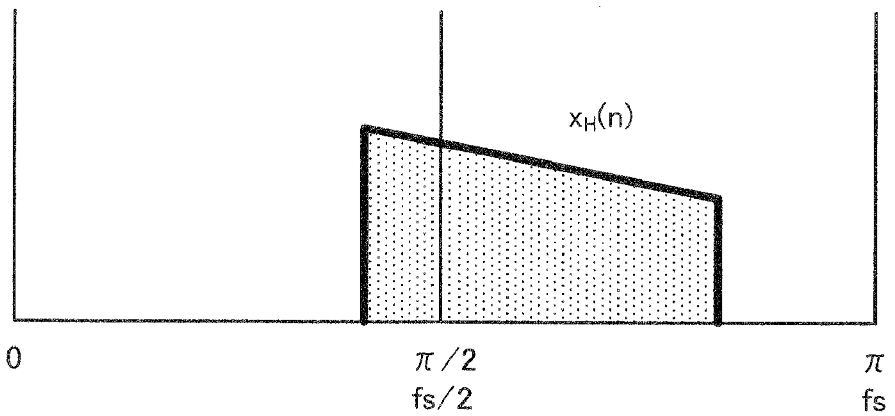
(a)
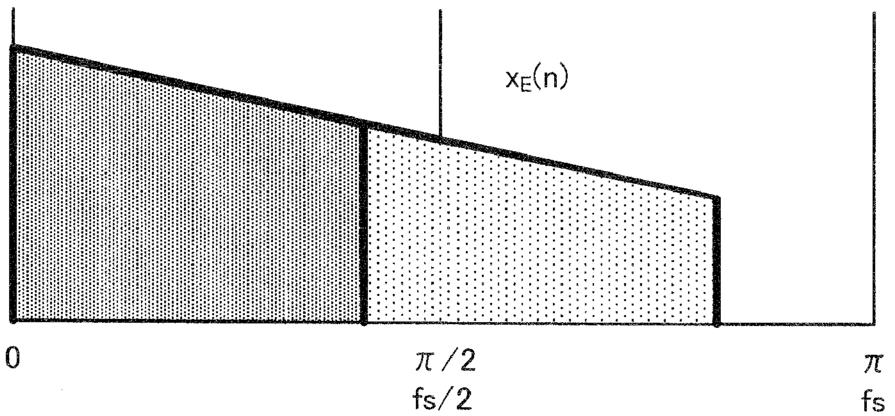
(b)

[FIG. 16]
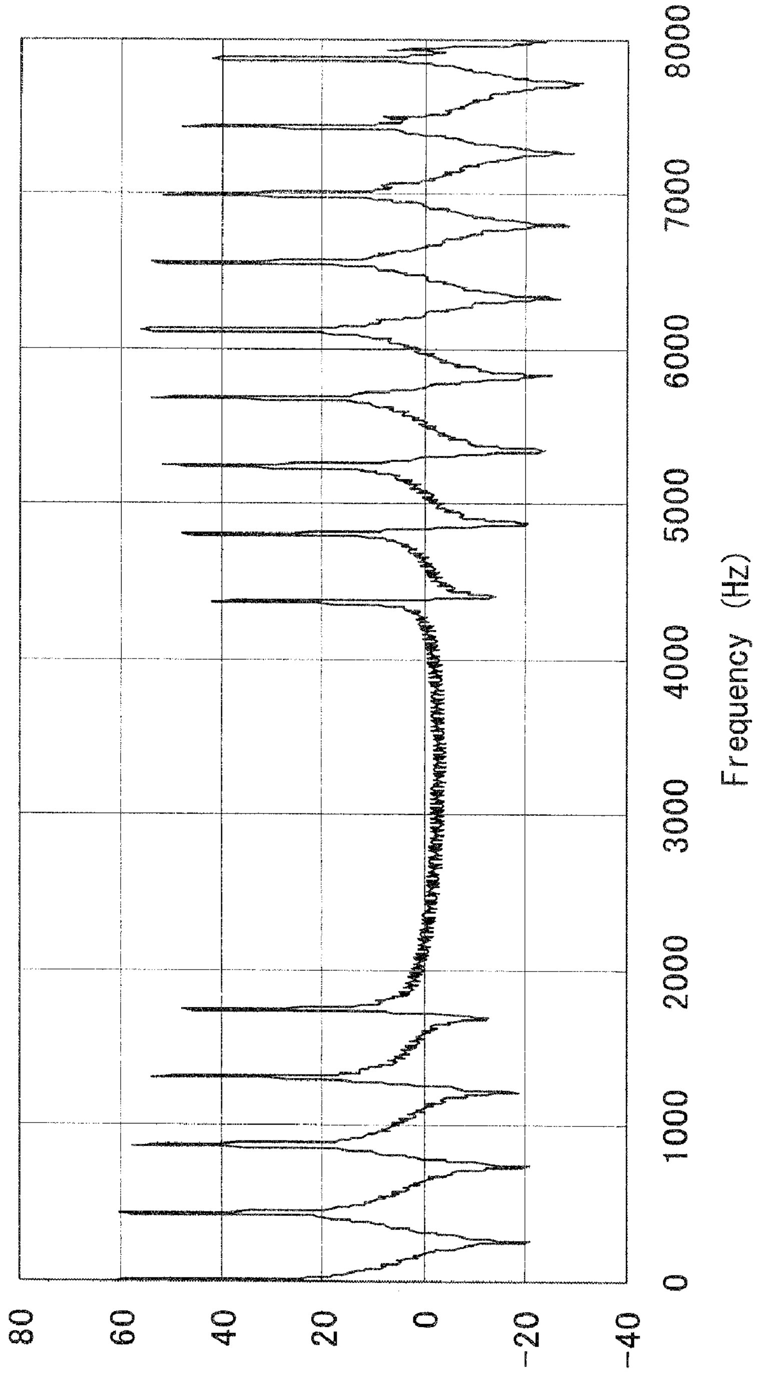

[FIG. 17]
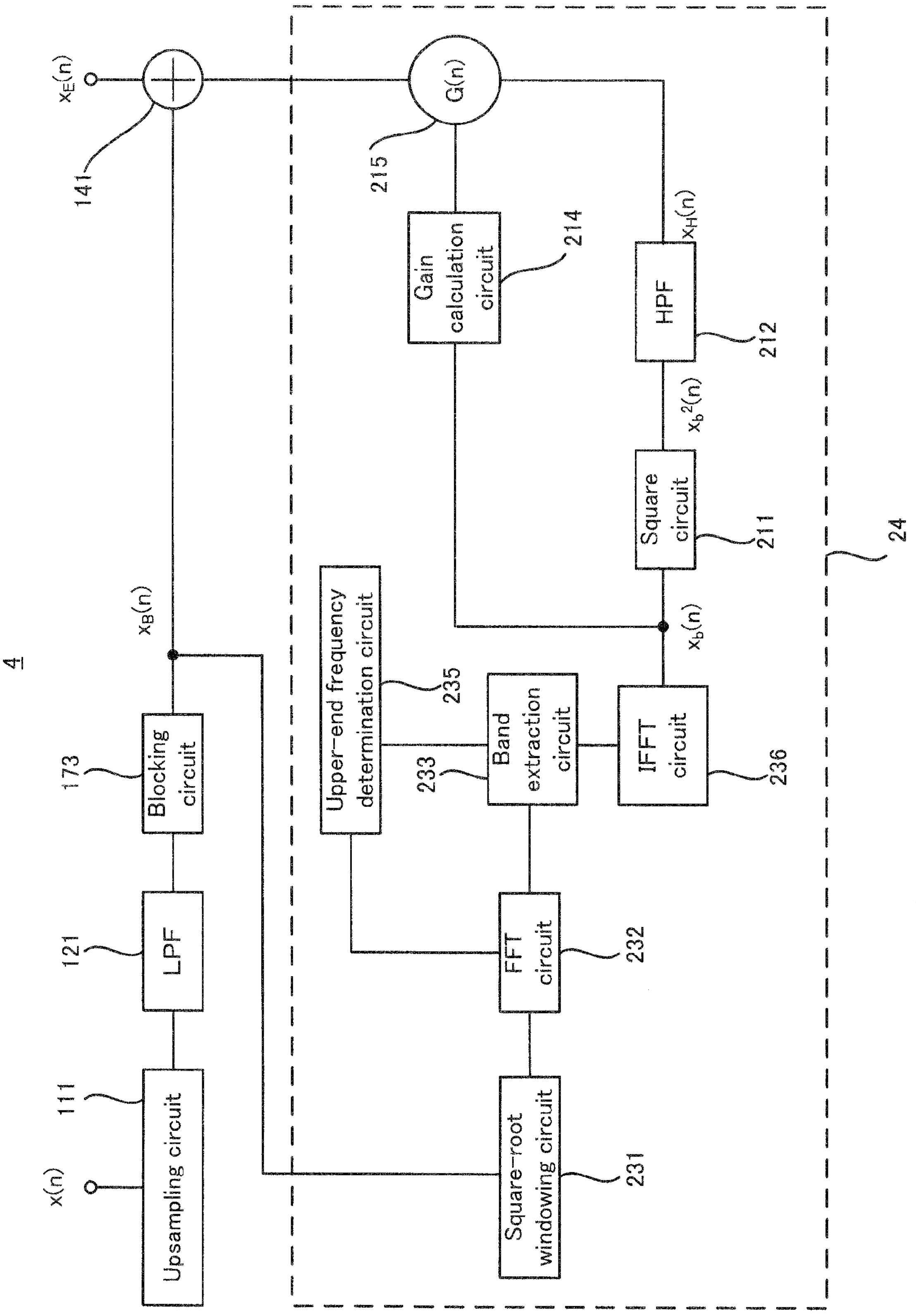

[FIG. 18]
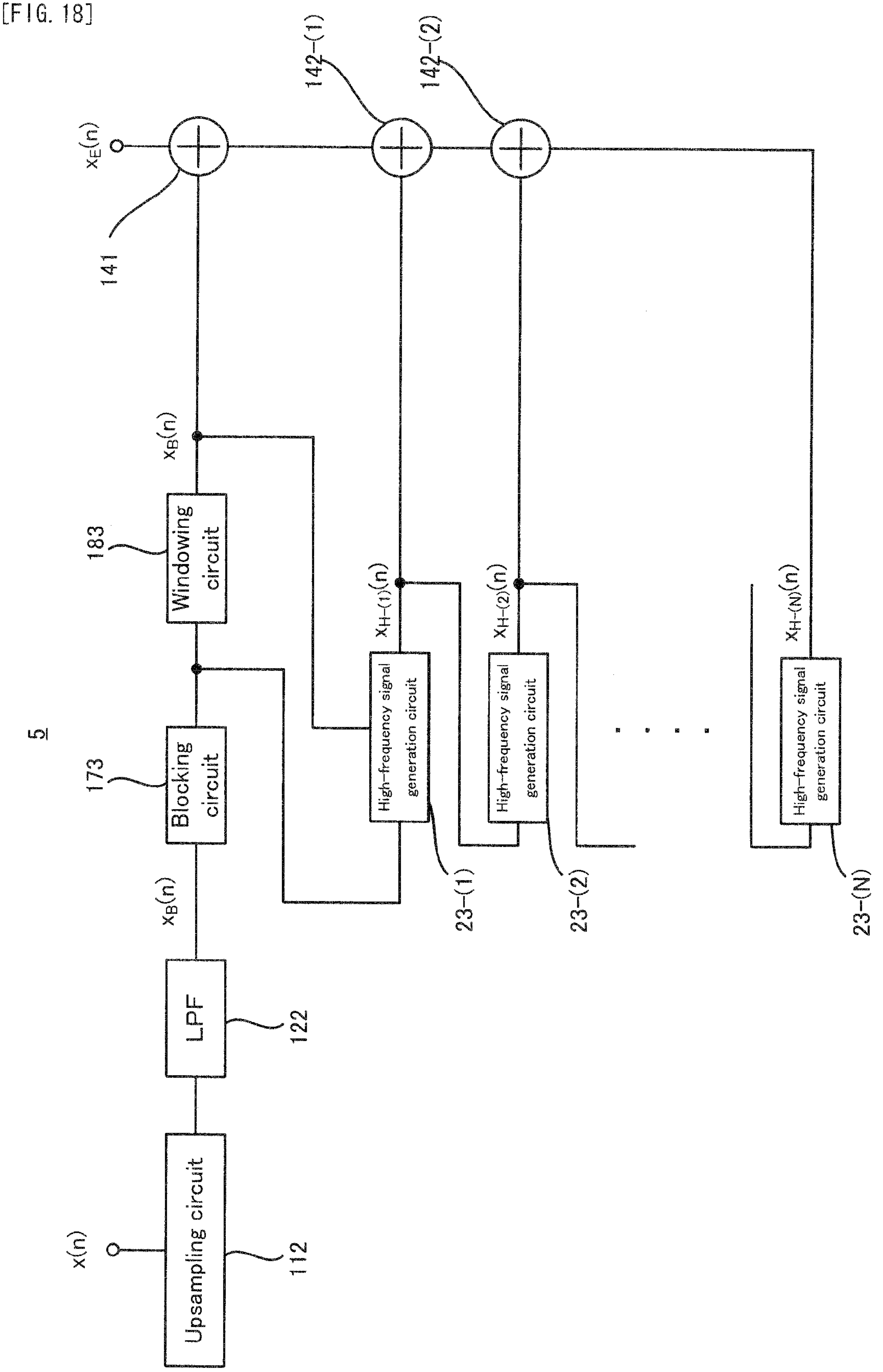

[FIG. 19]
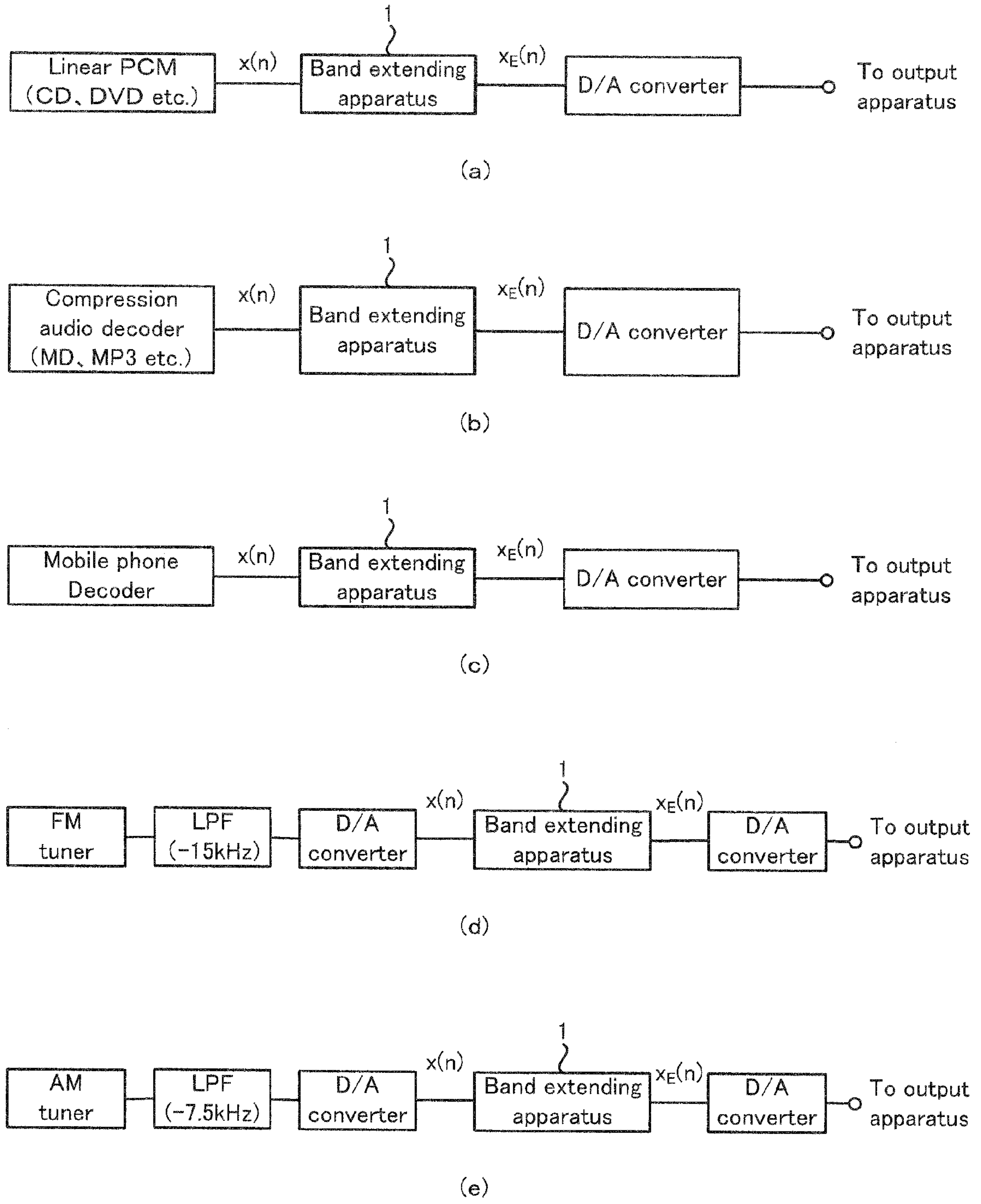

BAND EXTENDING APPARATUS AND METHOD

TECHNICAL FIELD

The present invention relates to a band extending apparatus (band spreading) for extending the band of an input signal such as an audio signal.

BACKGROUND ART

As a technology of extending the band of a digital audio signal, such a technology is known that a predetermined nonlinear process is performed on the digital audio signal to be inputted, to thereby generate a higher-frequency signal component than the digital audio signal to be inputted (refer to a patent document 1 and a non patent document 1). For example, in the technology disclosed in the patent document 1, the higher-frequency signal component than the digital audio signal to be inputted is generated by performing full-wave rectification, which is to take an absolute value of the digital audio signal to be inputted.

Patent document 1: Japanese Patent Application Publication NO. 2003-317395

Non Patent document 1: Ronald M. Aarts and Erik Larsen and Daniel Schobben, "IMPROVING PERCEIVED BASS AND RECONSTRUCTION OF HIGH FREQUENCIES FOR BAND LIMITED SIGNALS", Proc. 1st IEEE Benelux Workshop on Model based Processing and Coding of Audio (MPCA-2002), Belgium, Nov. 15, 2002, pp 59-71

DISCLOSURE OF INVENTION

Subject to be Solved by the Invention

However, if the predetermined nonlinear process is performed on the digital audio signal to be inputted, as described above, not only a double sound component and a sum sound (summational sound) component, which are originally desired to be generated, but also a direct current component and a difference sound component are generated simultaneously. Moreover, a signal component which has no harmonic relationship with the digital audio signal to be inputted is also generated simultaneously. If it is attempted to extract the double sound component and the sum sound component, which are originally desired to be generated, from the signal including these unnecessary signal components, a high pass filter having a large attenuation and a sharp shut off feature is required. However, the high pass filter having such a feature likely has a large circuit scale (in other words, a large amount of operation or calculation).

It is therefore an object of the present invention to provide a band extending apparatus and method which enable the band of the input signal to be extended more appropriately, for example.

Means for Solving the Subject

The above object of the present invention can be achieved by a band extending apparatus according to claim 1, provided with: a first generating device for generating a baseband signal by up-sampling an input signal and then transmitting it through a low-pass filter; a second generating device for generating a high-frequency signal, which is a signal component corresponding to the input signal and which is a signal component on a higher-frequency side than the input signal, by extracting a signal component on a higher-frequency side of a signal which is obtained by squaring a band limited signal, the band limited signal is a signal component with a predetermined band of the baseband signal; and a third generating device for generating an output signal by adding the high-frequency signal to the baseband signal.

The above object of the present invention can be also achieved by a band extending method according to claim 10, provided with: a first generating process of generating a baseband signal by up-sampling an input signal and then transmitting it through a low-pass filter; a second generating process of generating a high-frequency signal, which is a signal component corresponding to the input signal and which is a signal component on a higher-frequency side than the input signal, on the basis of a signal component on a higher-frequency side of a signal which is obtained by squaring a band limited signal, the band limited signal is a signal component with a predetermined band of the baseband signal; and a third generating process of generating an output signal by adding the high-frequency signal to the baseband signal.

The effects and other advantages of the present invention will become more apparent from the embodiments explained below.

BRIEF DESCRIPTION OF DRAWINGS

FIG. 1 is a block diagram conceptually showing the basic structure of a first example of the band extending apparatus of the present invention.

FIG. 2 are spectrum views conceptually showing the spectrum of each of an input signal, a baseband signal, and a band limited signal, related to the operation of the band extending apparatus in the first example.

FIG. 3 are spectrum views conceptually showing the spectrum of each of a high-frequency signal and a band extension signal, related to the operation of the band extending apparatus in the first example.

FIG. 4 is a block diagram conceptually showing a more specific structure of a gain calculation circuit.

FIG. 5 is a spectrum view showing the baseband signal.

FIG. 6 is a spectrum view showing a band extension signal generated by the baseband signal shown in FIG. 5.

FIG. 7 is a spectrum view showing the band limited signal.

FIG. 8 is a spectrum view showing a signal obtained by squaring the band limited signal shown in FIG. 7.

FIG. 9 is a spectrum view showing a signal after the band limited signal shown in FIG. 7 is full-wave rectified by the operation of a band extending apparatus in a comparison example.

FIG. 10 is a block diagram conceptually showing the basic structure of a second example of the band extending apparatus of the present invention.

FIG. 11 is a block diagram conceptually showing the basic structure of a third example of the band extending apparatus of the present invention.

FIG. 12 are spectrum views conceptually showing the spectrum of each of the input signal, the baseband signal, and the signal component extracted by the band extraction circuit, related to the operation of the band extending apparatus in the third example.

FIG. 13 is an explanatory diagram conceptually showing a block multiplied by a Hanning window.

FIG. 14 is a spectrum view conceptually showing an operation of determining upper-end frequency.

FIG. 15 are spectrum views conceptually showing the spectrum of each of the high-frequency signal and the band extension signal, related to the operation of the band extending apparatus in the third example.

FIG. 16 is a spectrum view showing a signal obtained by squaring the band limited signal shown in FIG. 7.

FIG. 17 is a block diagram conceptually showing the basic structure of a fourth example of the band extending apparatus of the present invention.

FIG. 18 is a block diagram conceptually showing the basic structure of a fifth example of the band extending apparatus of the present invention.

FIG. 19 are block diagrams conceptually showing the structure when the band extending apparatus is applied to various products.

DESCRIPTION OF REFERENCE CODES

1, 2, 3, 4, 5 band extending apparatus
111, 112 up-sampling circuit
121, 122 LPF
131, 162 delay circuit
141, 142 adder circuit
151 BPF
173 blocking circuit
183 windowing circuit
21, 23 high-frequency signal generation circuit
211 square circuit
212 HPF
214 gain calculation circuit
215 gain adjustment circuit
231 square-root windowing circuit
232, 234 FFT circuit
233 band extraction circuit
235 upper-end frequency determination circuit
216 IFFT circuit

BEST MODE FOR CARRYING OUT THE INVENTION

Hereinafter, as the best mode for carrying out the invention, an explanation will be given on embodiments of the band extending apparatus and method of the present invention.

(Embodiment of Band Extending Apparatus)

An embodiment of the band extending apparatus of the present invention is a band extending apparatus provided with: a first generating device for generating a baseband signal by up-sampling an input signal and then transmitting it through a low-pass filter; a second generating device for generating a high-frequency signal, which is a signal component corresponding to the input signal and which is a signal component on a higher-frequency side than the input signal, by extracting a signal component on a higher-frequency side of a signal which is obtained by squaring a band limited signal, the band limited signal is a signal component with a predetermined band of the baseband signal; and a third generating device for generating an output signal by adding the high-frequency signal to the baseband signal.

According to the embodiment of the band extending apparatus of the present invention, the sampling frequency of the input signal is up-sampled by the operation of the first generating device and then the input signal is transmitted through the low-pass filter. By this, the baseband signal is generated from the input signal.

Then, by the operation of the second generating device, the high-frequency signal which has a harmonic relationship with the input signal and which has the frequency on the higher-frequency side than the frequency of the input signal (more specifically, for example, a double sound component, a sum sound component, or the like of the frequency component of the input signal) is generated from the signal obtained by squaring the band limited signal, which is the signal component with the predetermined band of the baseband signal (more specifically, the signal component with the band which becomes a base for generating the high-frequency signal). More specifically, the high-frequency signal is generated by extracting the high-frequency component of the signal obtained by squaring the band limited signal (more specifically, the signal component on the higher-frequency side than the frequency of the input signal) using a HPF (High Pass Filter) or the like.

Then, by the operation of the third generating device, the output signal, which is a signal obtained by extending the band of the input signal to the higher-frequency side, is generated by adding the generated high-frequency signal to the baseband signal.

As described above, according to the band extending apparatus in the embodiment, it is possible to extend the band of the input signal. That is, it is possible to preferably generate the high-frequency signal which has the harmonic relationship with the input signal and which has the frequency on the higher-frequency side than the frequency of the input signal.

In one aspect of the embodiment of the band extending apparatus of the present invention, the second generating device generates the high-frequency signal by adjusting a gain of the high-frequency signal in accordance with an absolute value of the band limited signal.

According to this aspect, the amplitude level of the high-frequency signal can be adjusted to the amplitude level of the original baseband signal (or input signal). Specifically, as described above, since the high-frequency signal is generated by squaring the band limited signal, the amplitude level of the high-frequency signal is on the order of the square of the amplitude level of the original baseband signal (or input signal). Thus, by adjusting the gain of the high-frequency signal in accordance with the absolute value of the band limited signal, it is possible to adjust the amplitude level of the high-frequency signal to the amplitude level of the original baseband signal (or input signal).

In another aspect of the embodiment of the band extending apparatus of the present invention, it is further provided with a delaying device for adding a delay corresponding to a time required for the generation of the high-frequency signal by the second generating device, to the baseband signal, the third generating device adding the high-frequency signal to the baseband signal to which the delay corresponding to the time required for the generation of the high-frequency signal by the second generating device is added.

According to this aspect, since the delay of the time required for the generation of the high-frequency signal is added to the baseband signal, the high-frequency signal corresponding to the same time as the baseband signal can be added to the baseband signal. That is, the high-frequency signal generated in accordance with the baseband signal at a certain time can be added to the baseband signal at the certain time. By this, it is possible to eliminate an influence by the delay of the time required for the generation of the high-frequency signal.

In another aspect of the embodiment of the band extending apparatus of the present invention, the predetermined band is a band ranged between ½ of a upper-end frequency of the input signal and ½ of a sampling frequency of the input signal before being up-sampled.

By virtue of such construction, it is possible to preferably generate the high-frequency signal, using the band limited signal, which is a signal component with the band ranged between ½ of the upper-end frequency of the input signal and ½ of the sampling frequency of the input signal before being up-sampled.

In another aspect of the embodiment of the band extending apparatus of the present invention, the second generating device is further provided with: a Fourier transforming device for generating a Fourier transform signal by performing a Fourier transform process on the baseband signal; a determining device for determining a frequency at which a signal level of the Fourier transform signal is suddenly dropped, as an upper-end frequency; a changing device for changing a level of the Fourier transform signal so as to maintain a level of a signal component with a band defined in accordance with the upper-end frequency, of the Fourier transform signal, and to zero a level of a signal component other than the signal component with the band defined in accordance with the upper-end frequency, of the Fourier transform signal; and an inverse Fourier transforming device for generating an inverse Fourier transform signal by performing an inverse Fourier transform process on the Fourier transform signal in which the level is changed by the changing device, and the second generating device generates the high-frequency signal, with using the inverse Fourier transform signal as the band limited signal.

According to this aspect, the Fourier transform process is performed on the baseband signal, by the operation of the Fourier transforming device. As a result, the Fourier transform signal is generated. Then, the upper-end frequency, which is the frequency at which the signal level of the Fourier transform signal is suddenly dropped, is determined on the basis of the generated Fourier transform signal, by the operation of the determining device. Then, the level of the Fourier transform signal is maintained by the operation of the changing device so as to maintain the level of the signal component with the band defined in accordance with upper-end frequency of the Fourier transform signal. In the same manner, the level of the Fourier transform signal is changed by the operation of the changing device so as to zero the level of the signal component other than the signal component with the band defined in accordance with the upper-end frequency, of the Fourier transform signal. Then, the inverse Fourier transform process is performed on the Fourier transform signal in which the level is changed by the changing device, by the operation of the inverse Fourier transforming device. As a result, the inverse Fourier transform signal is generated.

The second generating device can generate the high-frequency signal, by treating the inverse Fourier transform signal as the band limited signal.

As described above, even if the baseband signal is treated in the frequency area in the Fourier transform process and the inverse Fourier transform process, the high-frequency signal can be preferably generated.

In particular, the band of the inverse Fourier transform signal treated as the band limited signal is defined in accordance with the upper-end frequency, which is determined by the operation of the determining device, as occasion demands. Therefore, without simply relying on the upper-end frequency of the baseband signal (in other words, the input signal) to be inputted, it is possible to generate the high-frequency signal, appropriately in accordance with the baseband signal to be inputted (specifically, while maintaining the continuity with the baseband signal to be inputted).

In an aspect of the band extending apparatus provided with the Fourier transforming device as described above, the changing device may change the level of the Fourier transform signal so as to maintain a level of a signal component with a band ranged between ½ of the upper-end frequency and ½ of a sampling frequency of the input signal before being up-sampled, of the Fourier transform signal, and to zero a level of a signal component other than the signal component with the band ranged between ½ of the upper-end frequency and ½ of the sampling frequency of the input signal before being up-sampled, of the Fourier transform signal.

By virtue of such construction, it is possible to generate the high-frequency signal, appropriately in accordance with the baseband signal to be inputted (specifically, while maintaining the continuity with the baseband signal to be inputted).

In an aspect of the band extending apparatus provided with the Fourier transforming device as described above, the band extending apparatus may be further provided with: a dividing device for dividing the baseband signal into a plurality of block in which one portion of each of the plurality of blocks overlaps adjacent blocks; and a first windowing device for performing a windowing process using a Hanning window, on the baseband signal divided into the plurality of blocks, the second generating device may be further provided with a second windowing device for performing a windowing process using a square root of a Hanning window, on the baseband signal divided into the plurality of blocks, the Fourier transforming device may perform the Fourier transform process on each of the baseband signal on which the windowing process using the Hanning window is performed and the baseband signal on which the windowing process using the square root of the Hanning window is performed, the determining device may determine the frequency at which the signal level of the Fourier transform signal, generated by performing the Fourier transform process on the baseband signal on which the windowing process using the Hanning window is performed, is suddenly dropped, as the upper-end frequency, and the changing device may change the level of the Fourier transform signal so as to maintain a level of a signal component with a band defined in accordance with the upper-end frequency, of the Fourier transform signal generated by performing the Fourier transform process on the baseband signal on which the windowing process using the square root of the Hanning window is performed, and to zero a level of a signal component other than the signal component with a band defined in accordance with the upper-end frequency, of the Fourier transform signal generated by performing the Fourier transform process on the baseband signal on which the windowing process using the square root of the Hanning window is performed.

By virtue of such construction, the baseband signal is divided into the plurality of blocks in which one portion of each block overlaps adjacent blocks, and the windowing process using the Hanning window is performed. Thus, in the case where the inverse Fourier transform process is performed on the baseband signal with the Fourier transform process performed (i.e. the Fourier transform signal), it is possible to regenerate the original baseband signal without distortion.

In an aspect of the band extending apparatus provided with the Fourier transforming device as described above, the band extending apparatus may be further provided with a dividing device for dividing the baseband signal into a plurality of block in which one portion of each of the plurality of blocks overlaps adjacent blocks, the second generating device may be further provided with a windowing device for performing a windowing process using a square root of a Hanning window, on the baseband signal divided into the plurality of blocks, the Fourier transforming device may perform the Fourier transform process on each of the baseband signal on which the windowing process using the square root of the Hanning window is performed, the determining device may determine the frequency at which the signal level of the Fourier transform signal, generated by performing the Fourier transform process on the baseband signal on which the windowing process using the square root of the Hanning window is performed, is suddenly dropped, as the upper-end frequency, and the changing device may change the level of the Fourier transform signal so as to maintain a level of a signal component with a band defined in accordance with the upper-end frequency, of the Fourier transform signal generated by performing the Fourier transform process on the baseband signal on which the windowing process using the square root of the Hanning window is performed, and to zero a level of a signal component other than the signal component with a band defined in accordance with the upper-end frequency, of the Fourier transform signal generated by performing the Fourier transform process on the baseband signal on which the windowing process using the square root of the Hanning window is performed.

By virtue of such construction, the baseband signal is divided into the plurality of blocks in which one portion of each block overlaps adjacent blocks, and the windowing process using the Hanning window is performed. Thus, in the case where the inverse Fourier transform process is performed on the baseband signal with the Fourier transform process performed (i.e. the Fourier transform signal), it is possible to regenerate the original baseband signal without distortion.

In another aspect of the embodiment of the band extending apparatus of the present invention, the band extending apparatus is provided with a plurality of second generating devices, and one second generating device of the plurality of second generating devices generates a new high-frequency signal by extracting a signal component on a higher-frequency side of a signal obtained by squaring the high-frequency signal, which is generated by at least one of the second generating devices other than the one second generating device.

According to this aspect, the new high-frequency signal including the signal component on the much higher-frequency side than the high-frequency signal can be generated by the operation of another second generating device, on the basis of the high-frequency signal generated by the second generating device. That is, since the second generating devices can be multistage-combined, it is possible to extend the band of the input signal, more widely.

(Embodiment of Band Extending Method)

An embodiment of the band extending method of the present invention is a band extending method provided with: a first generating process of generating a baseband signal by up-sampling an input signal and then transmitting it through a low-pass filter; a second generating process of generating a high-frequency signal, which is a signal component corresponding to the input signal and which is a signal component on a higher-frequency side than the input signal, on the basis of a signal component on a higher-frequency side of a signal which is obtained by squaring a band limited signal, the band limited signal is a signal component with a predetermined band of the baseband signal; and a third generating process of generating an output signal by adding the high-frequency signal to the baseband signal.

According to the embodiment of the band extending method of the present invention, it is possible to receive the same effects as those of the embodiment of the band extending apparatus of the present invention described above.

Incidentally, in response to the various aspects in the embodiment of the band extending apparatus of the present invention described above, the embodiment of the band extending method of the present invention can also employ various aspects.

The effects and other advantages of the embodiments will become more apparent from the examples explained below.

As explained above, according to the embodiment of the band extending apparatus of the present invention, it is provided with the first generating device, the second generating device, and the third generating device. According to the embodiment of the band extending method of the present invention, it is provided with the first generating process, the second generating process, and the third generating process. Therefore, it is possible to extend the band of the input signal, more appropriately.

EXAMPLES

Hereinafter, examples of the present invention will be explained on the basis of the drawings.

(1) First Example

Firstly, with reference to FIG. 1 to FIG. 9, an explanation will be given on a first example of the band extending apparatus of the present invention.

(1-1) Basic Structure

Firstly, with reference to FIG. 1, an explanation will be given on the basic structure of the first example of the band extending apparatus of the present invention. FIG. 1 is a block diagram conceptually showing the basic structure of the first example of the band extending apparatus of the present invention.

As shown in FIG. 1, a band extending apparatus 1 in the first example is provided with: an up-sampling circuit 111; a LPF (Low Pass Filter) 121; a delay circuit 131; an adder 141; a BPF (Band Pass Filter) 151; and a high-frequency signal generation circuit 21.

The up-sampling circuit 111 up-samples sampling frequency $f_s$ of an input signal x(n), which is a digital signal, for example by a factor of 2. The input signal x(n) whose sampling frequency if, is up-sampled on the up-sampling circuit 111 is outputted to the LPF 121.

The LPF 121 transmits therethrough a signal component with a band of 0 to π/2 (i.e. π/2), of the input signal x(n) whose sampling frequency f, is up-sampled. The signal component with the band of 0 to $f_s/2$ (i.e. π/2) corresponds to a baseband signal $x_B(n)$, The baseband signal $x_B(n)$ is outputted to each of the delay circuit 131 and the BPF 151.

Incidentally, the up-sampling circuit 111 and the LPF 121 constitute one specific example of the "first generating device" of the present invention.

The delay circuit 131 constitutes one specific example of the "delaying device" of the present invention. The delay circuit 131 adds a delay A, which corresponds to the time required for signal processing on the BPF 151 and the high-frequency signal generation circuit 21, to the baseband signal $x_B(n)$. The baseband signal $x_B(n)$ to which the delay A is added on the delay circuit 131 is outputted to the adder 141.

The adder 141 constitutes one specific example of the "third generating device" of the present invention. The adder 141 adds the baseband signal $x_B(n)$ outputted from the delay circuit 131 and a high-frequency signal $x_H(n)$ generated on the high-frequency signal generation circuit 21, to thereby generate a band extension signal (in other words, output signal) $x_E(n)$.

The BPF 151 extracts a band limited signal $x_b(n)$, which is a signal component with a band that becomes a basis for generating the high-frequency signal $x_H(n)$, from the baseband signal $x_B(n)$. More specifically, the BPF 151 extracts the band limited signal $x_b(n)$, which is a signal component with a band between ½ of the upper-limit frequency of the input signal x(n) and $F_s/2$, from the baseband signal $x_B(n)$, The band limited signal $x_b(n)$ extracted on the BPF 151 is outputted to the high-frequency generation circuit 21.

The high-frequency signal generation circuit 21 constitutes one specific example of the "second generating device" of the present invention. The high-frequency signal generation circuit 21 generates the high-frequency signal $x_H(n)$, which is a signal component on the higher-frequency side than the frequency of the signal components included in the input signal x(n). More specifically, the high-frequency signal generation circuit 21 is provided with: a square circuit 211; a HPF (High Pass Filter) 212; a gain calculation circuit 214; and a gain adjustment circuit 215.

The square circuit 211 squares the band limited signal $x_b(n)$ outputted from the BPF 151. The squared band limited signal $x_b(n)$ is outputted to the HPF 212.

The HPF 212 extracts a signal component on the higher-frequency side of the squared band limited signal $x_b(n)$. The extracted signal component on the higher-frequency side corresponds to the high-frequency signal $x_H(n)$. The high-frequency signal $x_H(n)$ is outputted to the gain adjustment circuit 215.

The gain calculation circuit 214 calculates a gain G(n) of the high-frequency signal $x_H(n)$, on the basis of the band limited signal $x_b(n)$ outputted from the BPF 151.

The gain adjustment circuit 215 multiplies the high-frequency signal $x_H(n)$ by the gain G(n) calculated on the gain calculation circuit 214. By this, the gain of the high-frequency signal $x_H(n)$ is adjusted. The high-frequency signal $x_H(n)$ whose gain is adjusted on the gain adjustment circuit 215 is outputted to the adder 141.

(1-2) Operation Principle

Next, with reference to FIG. 2 and FIG. 3, an explanation will be given on the operation principle of the band extending apparatus 1 in the first example. FIG. 2 are spectrum views conceptually showing the spectrum of each of the input signal x(n), the baseband signal $x_B(n)$, and the band limited signal $x_b(n)$, related to the operation of the band extending apparatus 1 in the first example. FIG. 3 are spectrum views conceptually showing the spectrum of each of the high-frequency signal $x_H(n)$ and the band extension signal $x_E(n)$, related to the operation of the band extending apparatus 1 in the first example.

As shown in FIG. 2(*a*), it is assumed that the input signal x(n) with the sampling frequency $f_s$ is inputted to the band extending apparatus 1.

For the input signal x(n), the up-sampling circuit 111 up-samples the sampling frequency $f_s$ by a factor of 2. Then, the LPF 121 extracts the signal component with the band of 0 to f/2 (i.e. π/2), from the input signal x(n) whose sampling frequency f, is up-sampled. As a result, the baseband signal $x_B(n)$ shown in FIG. 2(*b*) is extracted.

Then, the BPF 151 extracts the signal component with the band between ½ of the upper-limit frequency of the input signal x(n) and $f_s/2$, from the extracted baseband signal $x_B(n)$. As a result, the band limited signal $x_b(n)$ shown in FIG. 2(*c*) is extracted.

Then, the square circuit 211 squares the band limited signal $x_b(n)$ extracted on the BPF 151. That is, the square circuit 211 generates $x_b^2(n)$.

Then, the HPF 212 extracts a signal component on the higher-frequency side of the squared band limited signal $x_b(n)$ (i.e. $x_b^2(n)$). Specifically, the HPF 212 extracts the signal component on the higher-frequency side than the frequency of the baseband signal $x_B(n)$ (or the input signal x(n)).

Here, it is assumed that the band limited signal $x_b(n)$ is denoted by $x_b(n)=A\sin(\omega_1 t)+B\sin(\omega_2 t)$. In this case, the signal $x_b^2(n)$ obtained by squaring the band limited signal $x_b(n)$ is $x_b^2(n)$ $(A\sin(\omega_1 t)+B\sin(\omega_2 t))^2=(A^2+B^2)/2-A^2\cos(2\omega_1 t)/2-B^2\cos(2\omega_2 t)/2+AB\cos((\omega_1-\omega_2)t)$. That is, the squared band limited signal $x_b(n)$ includes a double sound component (specifically, a component denoted by angular frequency of $2\omega_1$ and $2\omega_2$) of a frequency component of the band limited signal $x_b(n)$ (specifically, a component denoted by angular frequency of $\omega_1$ and $\omega_2$), and a sum sound component (specifically, a component denoted by angular frequency of $\omega_1+\omega_2$), as well as a difference sound component (specifically, a component denoted by angular frequency of $\omega_1-\omega_2$) of a frequency component of the band limited signal $x_b(n)$ and a direct current component. Thus, the high-frequency signal $x_H(n)$ is generated by extracting the double sound component and the sum sound component (i.e. the signal components on the higher-frequency side) from the squared band limited signal $x_b(n)$.

In particular, this will be explained in details later using a graph (refer to FIG. 5 to FIG. 9), but the squared band limited signal $x_b(n)$ does not include an original signal component. That is, although the squared band limited signal $x_b(n)$ includes the double sound component and the sum sound component as well as the difference sound component and the direct current component, there is no signal component included between the double sound component/the sum sound component and the difference sound component/the direct current component. Therefore, the shutoff feature of the HPF 212 can be mild, and the circuit scale of the filter can be relatively reduced. For example, the blocking range of the HPF 212 may be 0 to about π/4, and the passing range may be about π/2 to π.

However, the amplitude level of the high-frequency signal $x_H(n)$ is on the square order of the amplitude level of the band Limited signal $x_b(n)$, such as $A^2$, AB, and $B^2$. Thus, such a process is performed that corrects the amplitude level of the squared band limited signal $x_b(n)$ generated on the square circuit 211, to the original amplitude level order. Specifically, firstly, before the band limited signal $x_b(n)$ is squared on the square circuit 211, the band limited signal $x_b(n)$ is divided by the square root of the maximum amplitude of the band limited signal $x_b(n)$ in advance. The square root of the maximum amplitude of the band limited signal $x_b(n)$ is, for example, $(2^n-1)^{1/2}$ if the band limited signal $x_b(n)$ is expressed by n bits. Specifically, the square root of the maximum amplitude of the band limited signal $x_b(n)$ is $(2^{16}-1)^{1/2}\approx 181$ if the band limited signal $x_b(n)$ is expressed by 16 bits. The division operation is performed on the band limited signal $x_b(n)$, which is the output of the BPF 151. Then, on the square circuit 211, the squared band limited signal $x_b^2(n)$ is generated by squaring the band limited signal $x_b(n)$ divided by the square root of the maximum amplitude.

Moreover, by virtue of the operations of the gain calculation circuit 214 and the gain adjustment circuit 215 or the like, a gain adjustment process is performed, wherein the gain adjustment process is to correct the amplitude level of the high-frequency signal $x_H(n)$ generated on the HPF 212 to the original amplitude level order.

Now, the gain adjustment process will be explained while a more specific example of the gain calculation circuit 214 is explained. FIG. 4 is a block diagram conceptually showing the more specific structure of the gain calculation circuit 214.

As shown in FIG. 4, the gain calculation circuit 214 is provided with: an absolute value extraction circuit 244; a smoothing circuit 245; and a calculation circuit 246.

As for the band limited signal $x_b(n)$ outputted from the BPF 151, its absolute value $|x_b(n)|$ is calculated by the operation of the absolute value extraction circuit 244.

Then, in order to inhibit an abrupt change in the absolute value $|x_b(n)|$ of the band limited signal $x_b(n)$, a smoothing process is performed on the absolute value $|x_b(n)|$ of the band limited signal $x_b(n)$, by the operation of the smoothing circuit 245. Specifically, the smoothed absolute value $|x_b(n)|$ of the band limited signal $x_b(n)$ (hereinafter referred to as a "smoothed absolute value" as occasion demands), s(n), is denoted by $s(n)=(1-\alpha)\times s(n-1)+\alpha\times|x_b(n)|$. Here, the "$\alpha$" is a constant defined in a range between 0 and 1, in order to adjust the degree of smoothing. That is, in accordance with an aspect of the change in the absolute value $|x_b(n)|$ of the band limited signal $x_b(n)$, a preferable value is determined as the constant $\alpha$, as occasion demands.

Then, the gain G(n) actually multiplied by the high-frequency signal $x_H(n)$ outputted from the HPF 212 is calculated by the operation of the calculation circuit 246.

Specifically, the gain G(n) is denoted by AMAX/(s(n)+c) if the maximum value of the smoothed absolute value is AMAX. Here, "c" is a small constant to prevent such a disadvantage that the denominator becomes 0, and a preferable value is set as occasion demands. Moreover, the maximum value of the smoothed absolute value, AMAX, is for example $(2^n-1)^{1/2}$ if the band limited signal $x_b(n)$ is expressed by n bits. Specifically, the maximum value of the smoothed absolute value is $(2^{16}-1)^{1/2}\approx 181$ if the band limited signal $x_b(n)$ is expressed by 16 bits.

However, if the maximum value of the gain G(n) is GMAX, which is introduced from the viewpoint of preventing the gain G(n) from being too large for a small signal such as a noise, the gain G(n) is GMAX when EMAX/(s(n)+c) is greater than GMAX.

The gain G(n) calculated in this manner is multiplied by the high-frequency signal $x_H(n)$ generated on a multiplier 213, by the operation of the gain adjustment circuit 215. The high-frequency signal $x_H(n)$ multiplied by the gain G(n) is added to the baseband signal $x_B(n)$ on the adder 141. As a result, as shown in FIG. 3(*b*), the band extension signal $x_E(n)$ is generated.

Incidentally, the delay A, which corresponds to the time required to generate the high-frequency signal $x_H(n)$ by the operations of the BPF 151 and the high-frequency signal generation circuit 21, is added to the baseband signal $x_B(n)$ added on the adder 141, by the operation of the delay circuit 131. In other words, the delay circuit 131 adjusts the time between the baseband signal $x_B(n)$ extracted on the LPF 121 and the high-frequency signal $x_H(n)$ generated on the high-frequency signal generation circuit 21. Moreover, in other words, the delay circuit 131 adds the delay A to the baseband signal $x_B(n)$ such that the baseband signal $x_B(n)$ corresponding to a certain time and the high-frequency signal $x_H(n)$ generated from the baseband signal $x_B(n)$ corresponding to the certain time are added on the adder 141.

Now, with reference to FIG. 5 to FIG. 9, an explanation will be given on the band limited signal $x_b(n)$, the band extension signal $x_E(n)$, and the high-frequency signal $x_H(n)$, generated by the band extending apparatus 1 in the first example. FIG. 5 is a spectrum view showing the baseband signal $x_B(n)$. FIG. 6 is a spectrum view showing the band extension signal $x_E(n)$ generated from the baseband signal $x_B(n)$ shown in FIG. 5. FIG. 7 is a spectrum view showing the band limited signal $x_b(n)$. FIG. 8 is a spectrum view showing a signal $x_b^2(n)$ obtained by squaring the band limited signal $x_b(n)$ shown in FIG. 7. FIG. 9 is a spectrum view showing a signal after the band limited signal $x_b(n)$ shown in FIG. 7 is full-wave rectified by the operation of a band extending apparatus in a comparison example.

FIG. 5 shows a signal obtained by extracting e.g. a signal component with about 10000 Hz or less, from a signal with a sampling frequency of 44.1 kHz. This corresponds to the baseband signal $x_B(n)$, obtained by up-sampling the input signal x(n) having a sampling frequency of 22.05 kHz by a factor of 2 and then transmitting it through the LPF.

If a band extension process is performed on the baseband signal $x_B(n)$ shown in FIG. 5 by the operation of the band extending apparatus 1 in the first example, the base extension signal $x_E(n)$ shown in FIG. 6 is generated. As shown in FIG. 6, it can be seen that the band of the original signal (i.e. the baseband signal $x_B(n)$) is preferably extended.

FIG. 7 shows the band limited signal $x_b(n)$ obtained from the input signal, which is sampled at a sampling frequency of 8 kHz, whose basic frequency is 437.5 Hz, and in which all the amplitudes of harmonic are equal, by up-sampling the sampling frequency by a factor of 2 and then extracting a signal component with a band of 2 kHz to 4 kHz.

If the band limited signal $x_b(n)$ shown in FIG. 7 is squared by the operation of the band extending apparatus 1 in the first example, the signal $x_b^2(n)$ shown in FIG. 8 is generated. As shown in FIG. 8, the signal $x_b^2(n)$ has a harmonic relationship with the original signal (i.e. the band limited signal $x_b(n)$), and the signal $x_b^2(n)$ includes the double sound component and the sum sound component of the original signal, as well as the direct current component and the difference sound component of the original signal. However, because the original signal and the signal that does not have a harmonic relationship with the original signal are not included, the difference sound component and the direct current component can be removed by the HPF 212 having the mild shutoff feature. This results in the generation of the band limited signal $x_b(n)$ in which the band (i.e. band of 2 kHz to 4 kHz) of the original signal (i.e. the band limited signal $x_b(n)$) is preferably extended to 4 kHz to 8 kHz.

On the other hand, if the band extension process, in which the high-frequency signal $x_H(n)$ is generated by performing the full-wave rectification by the operation of the band extending apparatus in the comparison example, is performed on the band limited signal $x_b(n)$ shown in FIG. 7, not only the double sound component and the sum sound component of the original signal as well as the direct current component and the difference sound component of the original signal, but also many unnecessary components which do not have a harmonic relationship with the original signal or which correspond to the original signal itself are generated. If it is attempted to extract the double sound component and the sum sound component, which are originally desired to be generated, from those unnecessary signal components (in particular, the unnecessary signal components that correspond to the original signal itself), such a HPF (High Pass Filter) that has a large attenuation and a sharp shut off feature is required. However, the HPF having such a feature likely has a large circuit scale (in other words, a large amount of operation or calculation).

According to the band extending apparatus 1 in the first example, however, it is possible to preferably extend the band of the original signal by using the HPF 212 having the mild shutoff feature. Moreover, it is also possible to relatively reduce the circuit scale of the band extending apparatus 1 while preferably extending the band of the original signal.

In addition, since the gain of the high-frequency signal $x_H(n)$ is adjusted such that the amplitude level of the high-frequency signal $x_H(n)$ matches the amplitude level of the original signal, it is possible to preferably extend the band of the original signal while maintaining the consistency in the signal level with the original signal.

(2) Second Example

Next, with reference to FIG. 10, an explanation will be given on a second example of the band extending apparatus of the present invention. FIG. 10 is a block diagram conceptually showing the basic structure of the second example of the band extending apparatus of the present invention. Incidentally, the same constituents as those of the band extending apparatus 1 in the first example described above carry the same reference numbers, and the detailed explanation thereof will be omitted.

As shown in FIG. 10, in a band extending apparatus 2 in the second example, N high-frequency signal generation circuits 21 are multistage-connected (wherein N is an integer of 2 or more).

In the band extending apparatus 2 in the second example with such a structure, firstly, an up-sampling circuit 112 up-samples the sampling frequency $f_s$ by a factor of $2^N$. Then, a LPF 122 extracts a signal component with a band of 0 to $f_s/2$ (i.e. $\pi/2^N$), from the input signal x(n) whose sampling frequency $f_s$ is up-sampled by a factor of $2^N$. As a result, the baseband signal $x_B(n)$ is extracted.

Then, a BPF 151 extracts a signal component with a band between ½ of the upper-limit frequency of the input signal x(n) and $f_s/2$, from the extracted baseband signal $x_B(n)$. As a result, the band limited signal $x_b(n)$ is extracted. Then, the high-signal generation circuit 21-(1) generates a high-frequency signal $x_{H-(1)}(n)$ from the band limited signal $x_b(n)$.

The high-frequency signal $x_{H-(1)}(n)$ generated on the high-signal generation circuit 21-(1) is outputted to a delay circuit 162-(1), and simultaneously outputted to the high-signal generation circuit 21-(2) which is connected to the next stage of the high-signal generation circuit 21-(1).

The high-signal generation circuit 21-(2) generates a new high-frequency signal $x_{H-(2)}(n)$ which is higher-frequency than the high-frequency signal $x_{H-(1)}(n)$, from the high-frequency signal $x_{H-(1)}(n)$ generated on the high-signal generation circuit 21-(1). The high-frequency signal $x_{H-(2)}(n)$ generated on the high-signal generation circuit 21-(2) is outputted to a delay circuit 162-(2), and simultaneously outputted to the high-signal generation circuit 21-(3) which is connected to the next stage of the high-signal generation circuit 21-(2). Subsequently such an operation is repeated by the number of the multistage-connected high-signal generation circuits 21.

A delay C(1) added to the high-frequency signal $x_{H-(1)}(n)$ on the delay circuit 162-(1) is a time corresponding to the time required to generate each of the high-frequency signals $x_{H-(2)}(n)$, $x_{H-(3)}(n)$, . . . , $x_{H-(N)}(n)$ on respective one of the high-signal generation circuits 21-(2), 21-(3), . . . , 21-(N), which are connected at lower stages than the high-signal generation circuit 21-(1) corresponding to the delay circuit 162-(1). In other words, the delay C(1) added to the high-frequency signal $x_{H-(1)}(n)$ on the delay circuit 162-(1) is the sum of a delay C(2) added on the delay circuit 162-(2) connected at the next stage of the delay circuit 162-(1) and the time required to generate the high-frequency signal $x_{H-(2)}(n)$ on the high-signal generation circuit 21-(2).

That is, a delay C(m) added to the high-frequency signal $x_{H-(m)}(n)$ on a delay circuit 162-(*m*) (wherein $1 \leqq m \leqq N$) is a time corresponding to the time required to generate each of the high-frequency signals $x_{H-(m+1)}(n)$, $x_{H-(m+2)}(n)$, . . . , $x_{H-(N)}(n)$ on respective one of the high-signal generation circuits 21-(*m*+1), 21-(*m*+2), . . . , 21-(N), which are connected at lower stages than the high-signal generation circuit 21-(*m*) corresponding to the delay circuit 162-(*m*). In other words, the delay C(m) added to the high-frequency signal $x_{H-(m)}(n)$ on the delay circuit 162-(*m*) is the sum of a delay C(m+1) added on the delay circuit 162-(*m*+1) connected at the next stage of the delay circuit 162-(*m*) and the time required to generate the high-frequency signal $x_{H-(m+1)}(n)$ on the high-signal generation circuit 21-(*m*+1).

Moreover, the delay A added to the baseband signal $x_B(n)$ on a delay circuit 132 is the sum of the time required to generate each of the high-frequency signals $x_{H-(1)}(n)$, $x_{H-(2)}(n)$, . . . , $x_{H-(N)}(n)$ on respective one of the high-signal generation circuits 21-(1), 21-(2), . . . , 21-(N) and the time required for the process on the BPF 152. In other words, the delay A added to the baseband signal $x_B(n)$ on a delay circuit 132 is the sum of the delay C(1) added on the delay circuit 162-(1), the time required to generate the high-frequency signal $x_{H-(1)}(n)$ on the high-frequency signal generation circuit 21-(1), and the time required for the process on the BPF 152.

Then, the high-frequency signal $x_{H-(N)}(n)$ and the high-frequency signal $x_{H-(N-1)}(n)$ with a delay C(N−1) added are added on an adder 142-(N−1), and moreover, to the addition result, the high-frequency signal $x_{H-(N-2)}(n)$ with a delay C(N−2) added is added on an adder 142 (N−2). Subsequently, the same operation is repeated by the number of the multi-stage-connected high-frequency signal generation circuits 21.

According to the band extending apparatus 2 in the second example having such a structure, it is possible to receive the same effects as those of the band extending apparatus 1 in the first example described above, and it is possible to extend the input signal so as to have a wider band. Specifically, if the N high-frequency signal generation circuits 21 are multistage-connected, the band of the input signal x(n) can be extended by a factor of $2^N$.

(3) Third Example

Next, with reference to FIG. 11 to FIG. 16, an explanation will be given on a third example of the band extending apparatus of the present invention. Incidentally, the same constituents as those of the band extending apparatus 1 in the first example and the band extending apparatus 2 in the second example described above carry the same reference numbers, and the detailed explanation thereof will be omitted.

(3-1) Basic Structure

Firstly, with reference to FIG. 11, an explanation will be given on the basic structure of the third example of the band extending apparatus of the present invention. FIG. 11 is a block diagram conceptually showing the basic structure of the third example of the band extending apparatus of the present invention.

As shown in FIG. 11, a band extending apparatus 3 in the third example is provided with: the up-sampling circuit 111; the LPF (Low Pass Filter) 121; a blocking circuit 173; a windowing circuit 183; the adder 141; and a high-frequency signal generation circuit 23.

The blocking circuit 173 constitutes one specific example of the "dividing device" of the present invention. The blocking circuit 173 performs a blocking process on the baseband signal $x_B(n)$ outputted from the LPF 121. More specifically, the blocking circuit 173 divides the baseband signal $x_B(n)$ into a constant sample number of blocks. Here, in particular, the baseband signal $x_B(n)$ is divided such that the halves of each block overlaps the respective adjacent blocks. That is, the baseband signal $x_B(n)$ is divided such that the right half of each block is adjacent to the right-adjacent block and that the left half of each block is adjacent to the left-adjacent block. The baseband signal $x_B(n)$ on which the blocking process is performed on the blocking circuit 173 is outputted to the windowing circuit 183 and a square-root windowing circuit 231 in the high-frequency signal generation circuit 23.

The windowing circuit 183 constitutes one specific example of the "windowing device" of the present invention. The windowing circuit 183 multiples the baseband signal $x_B(n)$ with the blocking process performed, by a Hanning window. The baseband signal $x_B(n)$ multiplied by the Hanning window is outputted to each of a FFT (Fast Fourier Transform) circuit 234 in the high-frequency signal generation circuit 23 and the adder 141.

The high-frequency signal generation circuit 23 constitutes one specific example of the "second generating device" of the present invention. The high-frequency signal generation circuit 23 generates the high-frequency signal $x_H(n)$, which is a signal component on the higher-frequency side than the frequency of the signal components included in the input signal x(n). More specifically, the high-frequency signal generation circuit 23 is provided with: the square-root windowing circuit 231; a FFT circuit 232; a band extraction circuit 233; the FFT circuit 234; an upper-end frequency determination circuit 235; an IFFT (Inverse Fast Fourier Transform) circuit 236; the square circuit 211; the HPF 212; the gain calculation circuit 214; and the gain adjustment circuit 215.

The square-root windowing circuit constitutes one specific example of the "windowing device" of the present invention. The square-root windowing circuit multiples the baseband signal $x_B(n)$ with the blocking process performed, by the square root of the Hanning window. The baseband signal $x_B(n)$ multiplied by the square root of the Hanning window is outputted to the FFT circuit 232.

The FFT circuit 232 constitutes one specific example of the "Fourier transforming device" of the present invention. The FFT circuit 232 performs a fast Fourier transform process on the baseband signal $x_B(n)$ multiplied by the square root of the Hanning window on the square-root windowing circuit 231. The baseband signal on which the fast Fourier transform process is performed on the FFT circuit 232 (hereinafter the baseband signal on which the fast Fourier transform process is performed on the FFT circuit 232, i.e. the output of the FFT circuit 232, is referred to as a "fast Fourier transform output X(f)) is outputted to the band extraction circuit 233.

The band extraction circuit 233 constitutes one specific example of the "changing device" of the present invention. The band extraction circuit 233 extracts a signal component with a band corresponding to an upper-end frequency $f_U$ determined on the upper-end frequency determination circuit 235, from the baseband signal with the fast Fourier transform process performed, i.e. the fast Fourier transform output X(f). The signal component extracted on the band extraction circuit 233 is outputted to the IFFT circuit 236.

The FFT circuit 234 constitutes one specific example of the "Fourier transforming device" of the present invention. The FFT circuit 234 performs the fast Fourier transform process on the baseband signal $x_B(n)$ multiplied by the Hanning window on the windowing circuit 183. The baseband signal on which the fast Fourier transform process is performed on the FFT circuit 234 is outputted to the upper-end frequency determination circuit 235.

The upper-end frequency determination circuit 235 constitutes one specific example of the "determining device" of the present invention. The upper-end frequency determination circuit 235 determines the upper-end frequency $f_U$ of the baseband signal $x_B(n)$ on which the fast Fourier transform process is performed on the FFT circuit 234. The upper-end frequency $f_U$ determined on the upper-end frequency determination circuit 235 is outputted to the band extraction circuit 233.

The IFFT circuit 236 constitutes one specific example of the "inverse Fourier transforming device" of the present invention. The IFFT circuit 236 performs an inverse Fourier transform process on the signal component extracted on the band extraction circuit 233. As a result, an inverse Fourier transform signal is generated.

The inverse Fourier transform signal is the aforementioned band limited signal $x_b(n)$, as detailed later. Therefore, using the band limited signal $x_b(n)$ obtained from the inverse Fourier transform signal, the high-frequency signal $x_H(n)$ is generated by the operations of the square circuit 211, the HPF 212, the gain calculation circuit 214, and the gain adjustment circuit 215.

(3-2) Operation Principle

Next, with reference to FIG. 12 to FIG. 15, an explanation will be given on the operation principle of the band extending apparatus 3 in the third example. FIG. 12 are spectrum views conceptually showing the spectrum of each of the input signal x(n), the baseband signal $x_B(n)$, and the signal component extracted by the band extraction circuit 233, related to the operation of the band extending apparatus 3 in the third example. FIG. 13 is an explanatory diagram conceptually showing a block multiplied by the Hanning window. FIG. 14 is a spectrum view conceptually showing an operation of determining the upper-end frequency $f_U$. FIG. 15 are spectrum views conceptually showing the spectrum of each of the high-frequency signal $x_H(n)$ and the band extension signal $x_E(n)$, related to the operation of the band extending apparatus 3 in the third example.

As shown in FIG. 12(*a*), it is assumed that the input signal x(n) with the sampling frequency $f_s$ is inputted to the band extending apparatus 3.

For the input signal x(n), the up-sampling circuit 111 up-samples the sampling frequency $f_s$ by a factor of 2. Then, the LPF 121 extracts the signal component with the band of 0 to f/2 (i.e. $\pi/2$), from the input signal x(n) whose sampling frequency $f_s$ is up-sampled. As a result, the baseband signal $x_B(n)$ shown in FIG. 12(*b*) is extracted.

After that, the blocking circuit 173 performs the blocking process, which is performed on a time axis, on the baseband signal $x_B(n)$. Specifically, the blocking circuit 173 divides the baseband signal $x_B(n)$ into a certain sample number of blocks.

Then, the windowing circuit 183 multiplies the baseband signal $x_B(n)$ with the blocking process performed, by a Hanning window w(n). The baseband signal $x_B(n)$ multiplied by the Hanning window w(n) by the windowing circuit 183 is outputted to the FFT circuit 234. Incidentally, the Hanning window w(n) is a window function which is denoted by $w(n)=0.5+0.5\cos(2\pi n/(N-1))$ and in which if each window is ½-overlap-added to the adjacent windows, the addition result is 1.

The plurality of blocks multiplied by the Hanning window are shown in FIG. 13. The baseband signal $x_B(n)$ on which the blocking process and the multiplication by the Hanning window are performed, as shown in FIG. 13, can receive such an effect that the signal can be regenerated in re-synthesizing each block.

Then, the fast Fourier transform process is performed by the operation of the FFT circuit 234 on the baseband signal $x_B(n)$ on which the blocking process and the multiplication by the Hanning window are performed. That is, the processing area of the baseband signal $x_B(n)$ is converted from a time area to a frequency area. As a result, a logarithmic amplitude spectrum of the baseband signal $x_B(n)$, on which the blocking process and the multiplication by the Hanning window are performed, is obtained.

Then, the upper-end frequency determination circuit 235 determines the upper-end frequency $f_U$, on the basis of the logarithmic amplitude spectrum of the baseband signal $x_B(n)$, on which the blocking process and the multiplication by the Hanning window are performed and which is obtained by performing the fast Fourier transform process on the FFT circuit 234.

In the operation of determining the upper-end frequency, firstly, the amplitude logarithmic spectrum is smoothed by a Savitzky-Golay filter or the like, to thereby generate a smoothed spectrum as shown in a thick-line graph in FIG. 14. Incidentally, the amplitude logarithmic spectrum shown in FIG. 14 shows one example of the amplitude logarithmic spectrum corresponding to the input signal x(n) with a sampling frequency $f_s$ of 8000 Hz.

Then, the graph of the smoothed spectrum is scanned from the frequency of ½ of the sampling frequency $f_s$ of the input signal x(n) to the smaller frequency side. Then, frequency at a point at which the increase of spectrum intensity (in other words, amplitude denoted by a decibel value) is stopped is determined to be the upper-end frequency $f_U$. For example, in case of the graph shown in FIG. 14, the smoothed spectrum is scanned from the point of 4000 Hz to the left side of the graph, and the frequency at the point at which the spectrum intensity is stopped (about 3400 Hz in FIG. 14) is determined to be the upper-end frequency $f_U$. The determined upper-end frequency $f_U$ is outputted to the band extraction circuit 233.

On the other hand, the baseband signal $x_B(n)$ on which the blocking process is performed on the blocking circuit 173 is also outputted to the square-root windowing circuit 231 in the high-frequency signal generation circuit 23, in addition to the windowing circuit 183. The square-root windowing circuit 231 multiples the baseband signal $x_B(n)$ with the blocking process performed, by the square root of the Hanning window w(n) (i.e. $(w(n))^{1/2}$). The baseband signal $x_B(n)$ multiplied by the square root of the Hanning window w(n) by the square-root windowing circuit 231 is outputted to the FFT circuit 232.

Incidentally, for the following reason, the square root of the Hanning window w(n) is multiplied on the windowing circuit 231. As detailed later, in the third example, the high-frequency signal $x_H(n)$ is generated by squaring the band limited signal $x_b(n)$, which is obtained from the baseband signal $x_B(n)$ with the blocking process performed. Thus, considering that the band limited signal $x_b(n)$ is multiplied twice by the Hanning window w(n), which is expected to cause an impact, the high-frequency signal $x_H(n)$ is multiplied by the square of the Hanning window w(n). Therefore, in order to realize the situation that the high-frequency signal $x_H(n)$ is multiplied by the Hanning window w(n) when the band limited signal $x_b(n)$ is squared, the baseband signal $x_B(n)$ is multiplied by the square root of the Hanning window w(n).

Then, the fast Fourier transform process is performed by the operation of the FFT circuit 232 on the baseband signal $x_B(n)$ on which the blocking process and the multiplication by the square root of the Hanning window are performed. The fast Fourier transform output X(f) on which the fast Fourier transform process is performed on the FFT circuit 232 is outputted to the band extraction circuit 233.

Then, a signal component with a band of $f_U/2$ to $f_s/2$ as shown in FIG. 12(*c*) is extracted from the fast Fourier transform output X(f), by the operation of the band extraction circuit 233.

Specifically, of the fast Fourier transform output X(f), the spectrum intensity of the signal components with bands of $f_U/2$ to $f_s/2$ and $-f_s/2$ to $-f_U/2$ is maintained. On the other hand, of the fast Fourier transform output X(f), the spectrum intensity of the signal component other than the signal components with bands of $f_U/2$ to $f_s/2$ and $-f_s/2$ to $-f_U/2$ is zero-valued. That is, if the fast Fourier transform output X(f) in which the spectrum intensity is changed is denoted by Z(f), $Z(f)=X(f)$, for $f_U/2 \leqq |f| \leqq f_s/2$; $=0$, for $|f|<f_U/2$ or $f_s/2<|f|$.

Then, the IFFT circuit 236 performs the inverse Fourier transform process on the fast Fourier transform output Z(f) in which the spectrum intensity is changed. As a result, the band limited signal $x_b(n)$ is generated.

Thus, subsequently, as in the band extending apparatus 1 in the first example described above, the band limited signal $x_b(n)$ is squared, and the signal component on the higher-frequency side is extracted from the squared band limited signal $x_b^2(n)$, to thereby generate the high-frequency signal $x_H(n)$ as shown in FIG. 15(*a*). Moreover, even in the third example, as in the first example, such a process is performed that corrects the amplitude level of the high-frequency signal $x_H(n)$ generated on the multiplier 213, to the original amplitude level order. Then, the high-frequency signal $x_H(n)$ with that process performed is added to the baseband signal $x_B(n)$ on the adder 141. As a result, as shown in FIG. 15(*b*), the band extension signal $x_E(n)$ is generated.

Incidentally, in the third example, since the baseband signal $x_b(n)$ is blocked by the operation of the blocking circuit 173, the band extension signal $x_E(n)$ is ½-overlap-added to the adjacent blocks on the adder 141.

Now, with reference to FIG. 16, an explanation will be given on the high-frequency signal $x_H(n)$ generated by the band extending apparatus 3 in the third example. FIG. 16 is a spectrum view showing the signal $x_b^2(n)$ obtained by squaring the band limited signal $x_b(n)$ shown in FIG. 7.

The band limited signal $x_b(n)$ obtained from the input signal which is sampled at a sampling frequency of 8 kHz, whose basic frequency is 437.5 Hz, and in which all the amplitudes of high harmonic signal are equal, by up-sampling the sampling frequency by a factor of 2 and then extracting a signal component with a band of 2 kHz to 4 kHz (i.e. the band limited signal $x_b(n)$ shown in FIG. 7 described above) is squared by the operation of the band extending apparatus 3 in the third example, by which the signal $x_b^2(n)$ shown in FIG. 16 is generated. As shown in FIG. 16, the signal $x_b^2(n)$ has a harmonic relationship with the original signal (i.e. the band limited signal $x_b(n)$), and the signal $x_b^2(n)$ includes the double sound component and the sum sound component of the original signal, as well as the direct current component and the difference sound component of the original signal. However, because the original signal and the signal that does not have a harmonic relationship with the original signal are not included, the difference sound component and the direct current component can be removed by the HPF 212 having the mild shutoff feature. This results in the generation of the band limited signal $x_b(n)$ in which the band (i.e. band of 2 kHz to 4 kHz) of the original signal (i.e. the band limited signal $x_b(n)$) is preferably extended to 4 kHz to 8 kHz.

As described above, according to the band extending apparatus 3 in the third example, it is possible to receive the same effects as those of the band extending apparatus 1 in the first example described above.

In addition, in the third example, the logarithmic spectrum of the original signal (i.e. the band limited signal $x_b(n)$) is smoothed to determine the upper-end frequency $f_U$, and then the signal component with a band that is a basis for generating the high-frequency signal $x_H(n)$ is extracted on the basis of the upper-end frequency $f_U$. Thus, in accordance with the upper-end frequency $f_U$ of the original signal, the high-frequency signal $x_H(n)$ can be generated appropriately. That is, in the first example, the signal component with a band that is a basis for generating the high-frequency signal $x_H(n)$ is extracted fixedly from the BPF 151; however in the third example, it is possible to extract the signal component with a preferable band corresponding to the original signal, as the signal component with a band that is a basis for generating the high-frequency signal $x_H(n)$. By this, it is possible to preferably generate the high-frequency signal $x_H(n)$ suitable for the original signal (e.g. so as to be added to the original signal continuously or smoothly).

(4) Fourth Example

Next, with reference to FIG. 17, an explanation will be given on a fourth example of the band extending apparatus of the present invention. FIG. 17 is a block diagram conceptually showing the basic structure of the fourth example of the band extending apparatus of the present invention. Incidentally, the same constituents as those of the band extending apparatus 1 in the first example, the band extending apparatus 2 in the second example, or the band extending apparatus 3 in the third example described above carry the same reference numbers, and the detailed explanation thereof will be omitted.

As shown in FIG. 17, in a band extending apparatus 4 in the fourth example, the FFT circuit 234 and the windowing circuit 183 are eliminated, as compared to the band extending apparatus 3 in the third example. In the band extending apparatus 4 in the fourth example, the process performed on the FFT circuit 234 is performed on the FFT circuit 232, and the process performed on the windowing circuit 183 is performed on the square-root windowing circuit 231.

Specifically, the square-root windowing circuit 231 multiplies the baseband signal $x_B(n)$ with the blocking process performed, by the square root of the Hanning window w(n). Then, the fast Fourier transform process is performed by the operation of the FFT circuit 232 on the baseband signal $x_B(n)$ on which the blocking process and the multiplication by the square root of the Hanning window are performed. That is, the processing area of the baseband signal $x_B(n)$ is converted from the time area to the frequency area. As a result, the logarithmic amplitude spectrum (i.e. the fast Fourier transform output X(f)) is generated. The generated logarithmic amplitude spectrum is outputted to each of the upper-end frequency determination circuit 235 and the band extraction circuit 233. Then, the high-frequency signal $x_H(n)$ is generated by the same operation as that of the band extending apparatus 3 in the third example described above.

As described above, according to the band extending apparatus 4 in the fourth example, it is possible to generate the fast Fourier transform output X(f) used to determine the upper-end frequency $f_U$ and the fast Fourier transform output X(f) for extracting the signal component with the band that is a basis for generating the high-frequency signal $x_H(n)$, by using the same square-root windowing circuit 231 and the FFT circuit 232. In other words, in order to generate the fast Fourier transform output X(f) used to determine the upper-end frequency $f_U$ and the fast Fourier transform output X(f) for extracting the signal component with the band that is a basis for generating the high-frequency signal $x_H(n)$, it is unnecessary to provide the windowing circuit and the FFT circuit separately for the two objectives. Thus, according to the band extending apparatus 4 in the fourth example, it is possible to appropriately receive the same effects as those received by the band extending apparatus 3 in the third example, and it is also possible to simplify the circuit structure, as compared to the band extending apparatus 3 in the third example.

(5) Fifth Example

Next, with reference to FIG. 18, an explanation will be given on a fifth example of the band extending apparatus of the present invention. FIG. 18 is a block diagram conceptually showing the basic structure of the fifth example of the band extending apparatus of the present invention. Incidentally, the same constituents as those of the band extending apparatus 1 in the first example, the band extending apparatus 2 in the second example, the band extending apparatus 3 in the third example, or the band extending apparatus 4 in the fourth example described above carry the same reference numbers, and the detailed explanation thereof will be omitted.

As shown in FIG. 18, in a band extending apparatus 5 in the fifth example, N high-frequency signal generation circuits 23 are multistage-connected (wherein N is an integer of 2 or more).

In the band extending apparatus 5 in the fifth example with such a structure, firstly, the up-sampling circuit 112 up-samples the sampling frequency $f_s$ by a factor of 2N. Then, the LPF 122 extracts the signal component with a band of 0 to $f_s/2$ (i.e. $\pi/2^N$), from the input signal x(n) whose sampling frequency $f_s$ is up-sampled by a factor of $2^N$. As a result, the baseband signal $x_B(n)$ is extracted.

Then, each of the baseband signal $x_B(n)$ on which the blocking process is performed on the blocking circuit 173 and the baseband signal $x_B(n)$ which is multiplied by the Hanning window w(n) on the windowing circuit 183 is outputted to the high-frequency signal generation circuit 23-(1).

Then, on the high-frequency signal generation circuit 23-(1), the upper-end frequency $f_U$ is determined on the basis of the baseband signal $x_B(n)$ multiplied by the Hanning window w(n). Moreover, by the band extraction circuit 233 in the high-frequency signal generation circuit 23-(1), the signal component with a band between ½ of the upper-end frequency of the input signal x(n) and the $f_s/2$ is extracted from the fast Fourier transform output X(f) generated by that the FFT circuit 232 in the high-frequency signal generation circuit 23-(1) performs the Fourier transform process on the baseband signal $x_B(n)$. Then, the inverse Fourier transform process is performed on Z(f) obtained by doubling the spectrum intensity of the signal component extracted by the band extraction circuit 233 and zeroing the spectrum intensity of the signal component other than the signal component extracted by the band extraction circuit 233, to thereby generate a high-frequency signal $x_{H\text{-}(1)}(n)$.

The high-frequency signal $x_{H\text{-}(1)}(n)$ generated on the high-frequency signal generation circuit 23-(1) is outputted to an adder 142-(1) and simultaneously outputted to the high-frequency signal generation circuit 23-(2), which is connected to the next stage of the high-frequency signal generation circuit 23-(1).

The high-signal generation circuit 23-(2) generates a new high-frequency signal $x_{H-(2)}(n)$ which is higher-frequency than the high-frequency signal $x_{H-(1)}(n)$, from the high-frequency signal $x_{H-(1)}(n)$ generated on the high-signal generation circuit 23-(1). The high-frequency signal $x_{H-(2)}(n)$ generated on the high-signal generation circuit 23-(2) is outputted to an adder circuit 142-(2), and simultaneously outputted to the high-signal generation circuit 23-(3) which is connected to the next stage of the high-signal generation circuit 23-(2). Subsequently such an operation is repeated by the number of the multistage-connected high-signal generation circuits 23.

Then, a high-frequency signal $x_{H-(N)}(n)$ generated on the high-signal generation circuit 23-(N) and a high-frequency signal $x_{H-(N-1)}(n)$ generated on the high-signal generation circuit 23-(N−1) are added on an adder 142-(N−1), and moreover, to the addition result, a high-frequency signal $x_{H-(N-2)}(n)$ generated on high-signal generation circuit 23-(N−2) is added on an adder 142-(N−2). Subsequently, the same operation is repeated by the number of the multistage-connected high-signal generation circuits 23.

According to the band extending apparatus 5 in the fifth example with such a structure, it is possible to receive the same effects as those of the band extending apparatus 3 in the third example described above, and it is also possible to extend the input signal x(n) so as to have a wider band. Specifically, if the N high-frequency signal generation circuits 23 are multistage-connected, the band of the input signal x(n) can be extended by a factor of $2^N$.

(6) Example of Application to Actual Product

Next, with reference to FIG. 19, an explanation will be given on the case where the band extending apparatus 1 in the first example, the band extending apparatus 2 in the second example, the band extending apparatus 3 in the third example, the band extending apparatus 4 in the fourth example, or the band extending apparatus 5 in the fifth example described above is applied to various acoustic equipment. FIG. 19 are block diagrams conceptually showing the structure when the band extending apparatus is applied to various products.

FIG. 19(*a*) shows an example in which the band extending apparatus 1 in the first example, the band extending apparatus 2 in the second example, the band extending apparatus 3 in the third example, the band extending apparatus 4 in the fourth example, or the band extending apparatus 5 in the fifth example described above is applied to a CD player, a DVD player, or the like. In the CD player, the DVD player, or the like, an audio signal in a linear PCM format is treated as the input signal x(n). The audio signal with the band extended on the band extending apparatus 1 is converted to an analog signal on a D/A converter and then outputted to output equipment such as a speaker.

FIG. 19(*b*) shows an example in which the band extending apparatus 1 in the first example, the band extending apparatus 2 in the second example, the band extending apparatus 3 in the third example, the band extending apparatus 4 in the fourth example, or the band extending apparatus 5 in the fifth example described above is applied to a MD player, a MD3 player, or the like. In the MD player, the MD3 player, or the like, an audio signal on which a decoding process is performed on a compression audio decoder (e.g. a MP3 decoder, an ATRAC3 decoder, or the like) is treated as the input signal x(n). The audio signal with the band extended on the band extending apparatus 1 is converted to an analog signal on a D/A converter and then outputted to output equipment such as a speaker.

FIG. 19(*c*) shows an example in which the band extending apparatus 1 in the first example, the band extending apparatus 2 in the second example, the band extending apparatus 3 in the third example, the band extending apparatus 4 in the fourth example, or the band extending apparatus 5 in the fifth example described above is applied to a mobile phone or the like. In the mobile phone or the like, in general, a compression-encoded audio signal is transmitted and received. Thus, in the mobile phone or the like, an audio signal on which the decoding process is performed on a decoder is treated as the input signal x(n). The audio signal with the band extended on the band extending apparatus 1 is converted to an analog signal on a D/A converter and then outputted to output equipment such as a speaker.

FIG. 19(*d*) shows an example in which the band extending apparatus 1 in the first example, the band extending apparatus 2 in the second example, the band extending apparatus 3 in the third example, the band extending apparatus 4 in the fourth example, or the band extending apparatus 5 in the fifth example described above is applied to a FM radio or the like. In the FM radio or the like, a FM signal which is extracted by the LPF with a cutoff frequency of about 15 kHz and which is converted to a digital signal by an A/D converter (i.e. an audio signal included in the FM signal) is treated as the input signal x(n). The audio signal with the band extended on the band extending apparatus 1 is converted to an analog signal on a D/A converter and then outputted to output equipment such as a speaker.

FIG. 19(*e*) shows an example in which the band extending apparatus 1 in the first example, the band extending apparatus 2 in the second example, the band extending apparatus 3 in the third example, the band extending apparatus 4 in the fourth example, or the band extending apparatus 5 in the fifth example described above is applied to an AM radio or the like. In the AM radio or the like, an AM signal which is extracted by the LPF with a cutoff frequency of about 7.5 kHz and which is converted to a digital signal by an A/D converter (i.e. an audio signal included in the AM signal) is treated as the input signal x(n). The audio signal with the band extended on the band extending apparatus 1 is converted to an analog signal on the D/A converter and then outputted to output equipment such as a speaker.

The present invention is not limited to the aforementioned examples, but various changes may be made, if desired, without departing from the essence or spirit of the invention which can be read from the claims and the entire specification. A band extending apparatus and method, all of which involve such changes, are also intended to be within the technical scope of the present invention.

The invention claimed is:

1. A band extending apparatus comprising:

a first generating device for generating a baseband signal by up-sampling an input signal and then transmitting it through a low-pass filter;

a second generating device for generating a high-frequency signal, which is a signal component corresponding to the input signal and which is a signal component on a higher-frequency side than the input signal, by extracting a signal component on a higher-frequency side of a signal which is obtained by squaring a band limited signal, the band limited signal is a signal component with a predetermined band of the baseband signal; and a third generating device for generating an output signal by adding the high-frequency signal to the baseband signal, said second generating device further comprises:

a Fourier transforming device for generating a Fourier transform signal by performing a Fourier transform process on the baseband signal;

a determining device for determining a frequency at which a signal level of the Fourier transform signal is suddenly dropped, as an upper-end frequency;

a changing device for changing a level of the Fourier transform signal so as to maintain a level of a signal component with a band defined in accordance with the upper-end frequency, of the Fourier transform signal, and to zero a level of a signal component other than the signal component with the band defined in accordance with the upper-end frequency, of the Fourier transform signal; and an inverse Fourier transforming device for generating an inverse Fourier transform signal by performing an inverse Fourier transform process on the Fourier transform signal in which the level is changed by the changing device, and said second generating device generates the high-frequency signal, with using the inverse Fourier transform signal as the band limited signal.

2. The band extending apparatus according to claim 1, wherein said second generating device generates the high-frequency signal by adjusting a gain of the high-frequency signal in accordance with an absolute value of the band limited signal.

3. The band extending apparatus according to claim 1, further comprising a delaying device for adding a delay corresponding to a time required for the generation of the high-frequency signal by said second generating device, to the baseband signal, said third generating device adding the high-frequency signal to the baseband signal to which the delay corresponding to the time required for the generation of the high-frequency signal by said second generating device is added.

4. The band extending apparatus according to claim 1, wherein the predetermined band is a band ranged between ½ of an upper-end frequency of the input signal and ½ of a sampling frequency of the input signal before being up-sampled.

5. The band extending apparatus according to claim 1, wherein the changing device changes the level of the Fourier transform signal so as to maintain a level of a signal component with a band ranged between ½ of the upper-end frequency and ½ of a sampling frequency of the input signal before being up-sampled, of the Fourier transform signal, and to zero a level of a signal component other than the signal component with the band ranged between ½ of the upper-end frequency and ½ of the sampling frequency of the input signal before being up-sampled, of the Fourier transform signal.

6. The band extending apparatus according to claim 1, wherein said band extending apparatus further comprises:

a dividing device for dividing the baseband signal into a plurality of block in which one portion of each of the plurality of blocks overlaps adjacent blocks; and a first windowing device for performing a windowing process using a Hanning window, on the baseband signal divided into the plurality of blocks, said second generating device further comprises a second windowing device for performing a windowing process using a square root of a Hanning window, on the baseband signal divided into the plurality of blocks, said Fourier transforming device performs the Fourier transform process on each of the baseband signal on which the windowing process using the Hanning window is performed and the baseband signal on which the windowing process using the square root of the Hanning window is performed, said determining device determines the frequency at which the signal level of the Fourier transform signal, generated by performing the Fourier transform process on the baseband signal on which the windowing process using the Hanning window is performed, is suddenly dropped, as the upper-end frequency, and said changing device changes the level of the Fourier transform signal so as to maintain a level of a signal component with a band defined in accordance with the upper-end frequency, of the Fourier transform signal generated by performing the Fourier transform process on the baseband signal on which the windowing process using the square root of the Hanning window is performed, and to zero a level of a signal component other than the signal component with a band defined in accordance with the upper-end frequency, of the Fourier transform signal generated by performing the Fourier transform process on the baseband signal on which the windowing process using the square root of the Hanning window is performed.

7. The band extending apparatus according to claim 1, wherein said band extending apparatus further comprises a dividing device for dividing the baseband signal into a plurality of block in which one portion of each of the plurality of blocks overlaps adjacent blocks, said second generating device further comprises a windowing device for performing a windowing process using a square root of a Hanning window, on the baseband signal divided into the plurality of blocks, said Fourier transforming device performs the Fourier transform process on each of the baseband signal on which the windowing process using the square root of the Hanning window is performed, said determining device determines the frequency at which the signal level of the Fourier transform signal, generated by performing the Fourier transform process on the baseband signal on which the windowing process using the square root of the Hanning window is performed, is suddenly dropped, as the upper-end frequency, and said changing device changes the level of the Fourier transform signal so as to maintain a level of a signal component with a band defined in accordance with the upper-end frequency, of the Fourier transform signal generated by performing the Fourier transform process on the baseband signal on which the windowing process using the square root of the Hanning window is performed, and to zero a level of a signal component other than the signal component with a band defined in accordance with the upper-end frequency, of the Fourier transform signal generated by performing the Fourier transform process on the baseband signal on which the windowing process using the square root of the Hanning window is performed.

8. The band extending apparatus according to claim 1, wherein said band extending apparatus comprises a plurality of second generating devices, and one second generating device of the plurality of second generating devices generates a new high-frequency signal by extracting a signal component on a higher-frequency side of a signal obtained by squaring the high-frequency signal, which is generated by at least one of the second generating devices other than the one second generating device.

9. A band extending method comprising:

a first generating process of generating a baseband signal by up-sampling an input signal and then transmitting it through a low-pass filter;

a second generating process of generating a high-frequency signal, which is a signal component corresponding to the input signal and which is a signal component on a higher-frequency side than the input signal, on the basis of a signal component on a higher-frequency side of a signal which is obtained by squaring a band limited signal, the band limited signal is a signal component with a predetermined band of the baseband signal; and a third generating process of generating an output signal by adding the high-frequency signal to the baseband signal, said second generating process further comprises:

a Fourier transforming process of generating a Fourier transform signal by performing a Fourier transform process on the baseband signal;

a determining process of determining a frequency at which a signal level of the Fourier transform signal is suddenly dropped, as an upper-end frequency;

a changing process of changing a level of the Fourier transform signal so as to maintain a level of a signal component with a band defined in accordance with the upper-end frequency, of the Fourier transform signal, and to zero a level of a signal component other than the signal component with the band defined in accordance with the upper-end frequency, of the Fourier transform signal; and an inverse Fourier transforming process of generating an inverse Fourier transform signal by performing an inverse Fourier transform process on the Fourier transform signal in which the level is changed by the changing process, and said second generating process generates the high-frequency signal, with using the inverse Fourier transform signal as the band limited signal.

10. A band extending apparatus comprising:

a first generating device for generating a baseband signal by up-sampling an input signal and then transmitting it through a low-pass filter;

a first windowing device for performing a windowing process using a Hanning window, on the generated baseband signal;

a second windowing device for performing a windowing process using a square root of a Hanning window, on the generated baseband signal;

a second generating device for generating a high-frequency signal, which is a signal component corresponding to the input signal and which is a signal component on a higher-frequency side than the input signal, by extracting a signal component on a higher-frequency side of a signal obtained by squaring a band limited signal, the band limited signal is a signal component with a predetermined band of the baseband signal with the windowing process performed; and a third generating device for generating an output signal by adding the high-frequency signal to the baseband signal with the windowing process performed by said first windowing device.

11. A band extending method comprising:

a first generating process of generating a baseband signal by up-sampling an input signal and then transmitting it through a low-pass filter;

a first windowing process of performing a windowing process using a Hanning window, on the generated baseband signal;

a second windowing process of performing a windowing process using a square root of a Hanning window, on the generated baseband signal;

a second generating process of generating a high-frequency signal, which is a signal component corresponding to the input signal and which is a signal component on a higher-frequency side than the input signal, on the basis of a signal component on a higher-frequency side of a signal obtained by squaring a band limited signal, the band limited signal is a signal component with a predetermined band of the baseband signal with the windowing process performed; and a third generating process of generating an output signal by adding the high-frequency signal to the baseband signal with the windowing process performed by said first windowing process.

* * * * *